(12) United States Patent
Thiessen et al.

(10) Patent No.: US 10,752,433 B2
(45) Date of Patent: Aug. 25, 2020

(54) PORTABLE COLLAPSABLE STORAGE BIN AND UNLOADING SYSTEM

(71) Applicant: Westcap AG Corp., Grande Prairie (CA)

(72) Inventors: Lonny Thiessen, Grande Prairie (CA); Roland Thiessen, Grande Prairie (CA)

(73) Assignee: Westcap AG Corp., Grande Prairie (CA)

( * ) Notice: Subject to any disclaimer, the term of this patent is extended or adjusted under 35 U.S.C. 154(b) by 0 days.

(21) Appl. No.: 16/170,590

(22) Filed: Oct. 25, 2018

(65) Prior Publication Data
US 2019/0185258 A1 Jun. 20, 2019

(30) Foreign Application Priority Data

Dec. 20, 2017 (CA) .................................... 2989632

(51) Int. Cl.
*B65D 88/16* (2006.01)
*A01F 25/14* (2006.01)
(Continued)

(52) U.S. Cl.
CPC .......... *B65D 88/1631* (2013.01); *A01F 25/14* (2013.01); *B65D 88/30* (2013.01); *B65D 88/52* (2013.01); *E04H 7/24* (2013.01); *A01F 12/60* (2013.01); *B65D 88/005* (2013.01); *B65D 88/22* (2013.01)

(58) Field of Classification Search
CPC .... B65D 88/1631; B65D 88/30; B65D 88/52; E04H 7/24
See application file for complete search history.

(56) References Cited

U.S. PATENT DOCUMENTS 4,112,634 A * 9/1978 Bissinger ............. B65D 88/005
52/67
4,338,752 A * 7/1982 Stanelle ............... B65D 88/005
52/194
(Continued)

FOREIGN PATENT DOCUMENTS

FR 2319548 A1 * 2/1977 ............. B65D 88/26
GB 1269060 A * 3/1972 ............. B65D 88/26

OTHER PUBLICATIONS

Machine translation of FR 2319548 from espacenet.com.*

Primary Examiner — Jeremy Carroll
(74) Attorney, Agent, or Firm — Ryan W. Dupuis; Ade + Company Inc.; Kyle R. Satterthwaite

(57) ABSTRACT

A portable storage bin includes a base frame on the ground and a bin support frame operable relative to the base frame between a working position and a transport position which is reduced in height relative to the working position, and a storage envelope supported on the bin support frame to define a storage chamber for storing particulate material therein in the working position of the bin support frame in which the storage envelope is collapsible with the bin support frame from the working position to the transport position. The bin support frame has an upper frame portion from which the storage envelope is suspended in the working position and a central support post which is extendable in height between the upper frame portion and the base frame for raising the envelope from the transport position to the working position.

20 Claims, 26 Drawing Sheets

(51) Int. Cl.
    *B65D 88/30*     (2006.01)
    *E04H 7/24*     (2006.01)
    *B65D 88/52*     (2006.01)
    *B65D 88/22*     (2006.01)
    *A01F 12/60*     (2006.01)
    *B65D 88/00*     (2006.01)

(56) References Cited

U.S. PATENT DOCUMENTS

2016/0251152 A1* 9/2016 Krupa .................. B65D 88/005
                                                                                                    206/386
2018/0295782 A1* 10/2018 Dawoud ................. A01F 25/14

* cited by examiner

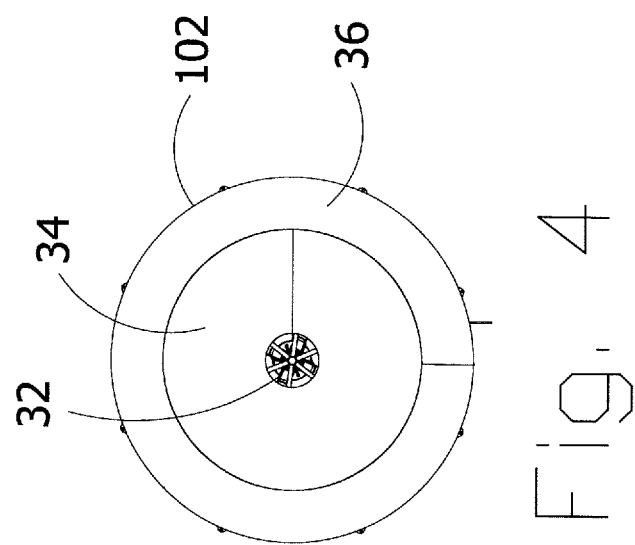
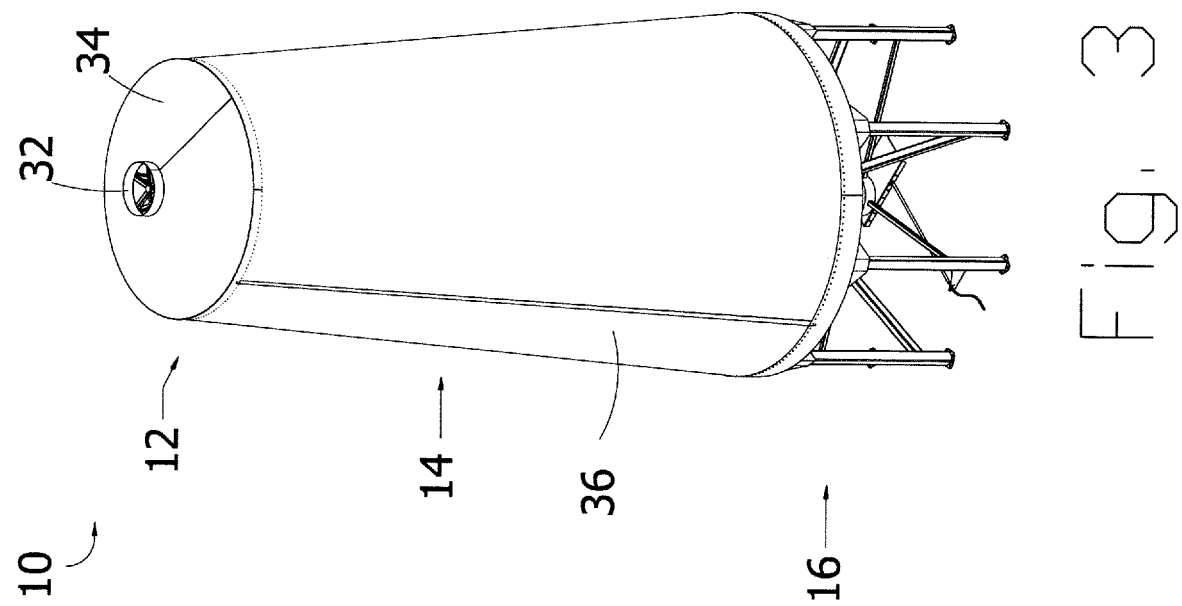

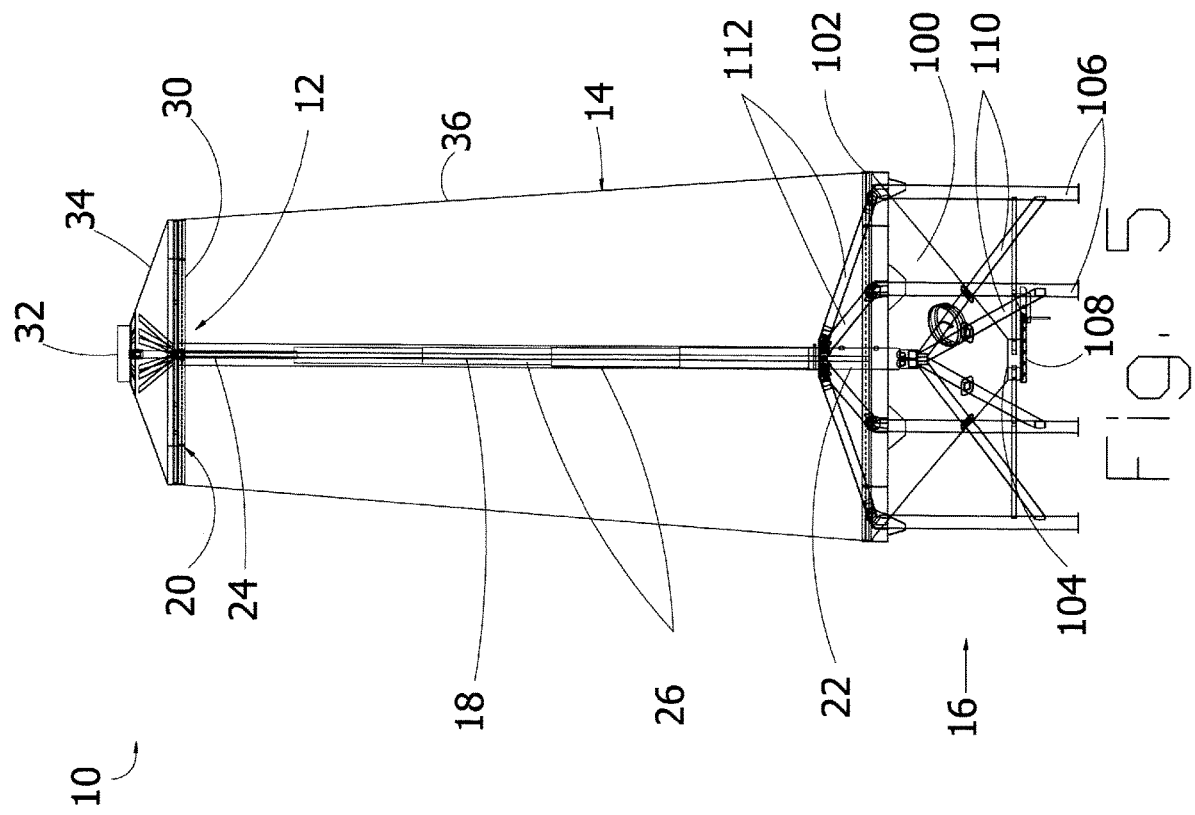

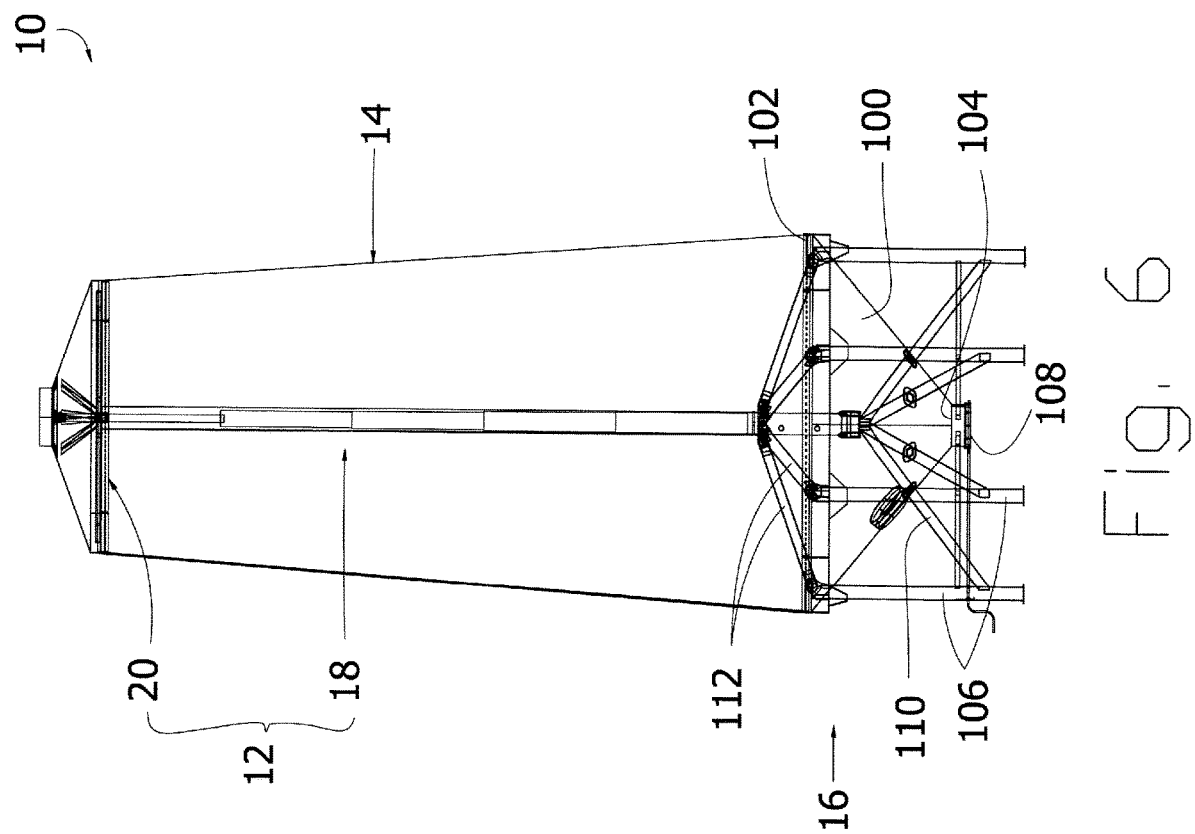

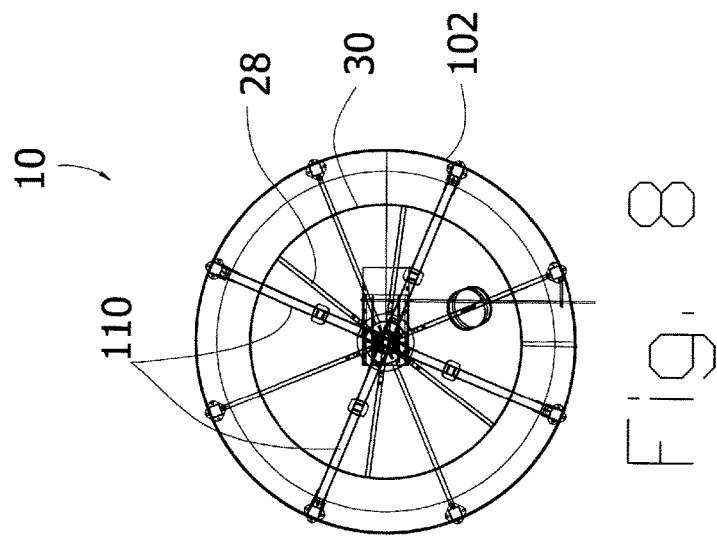
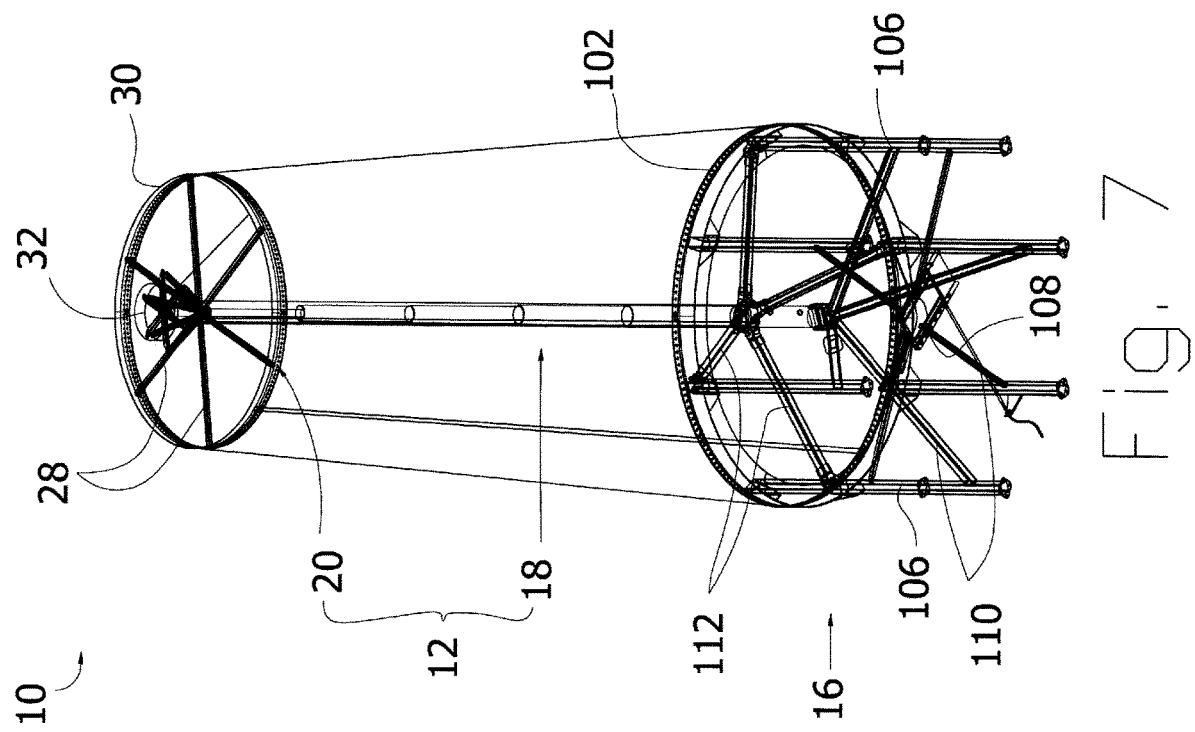

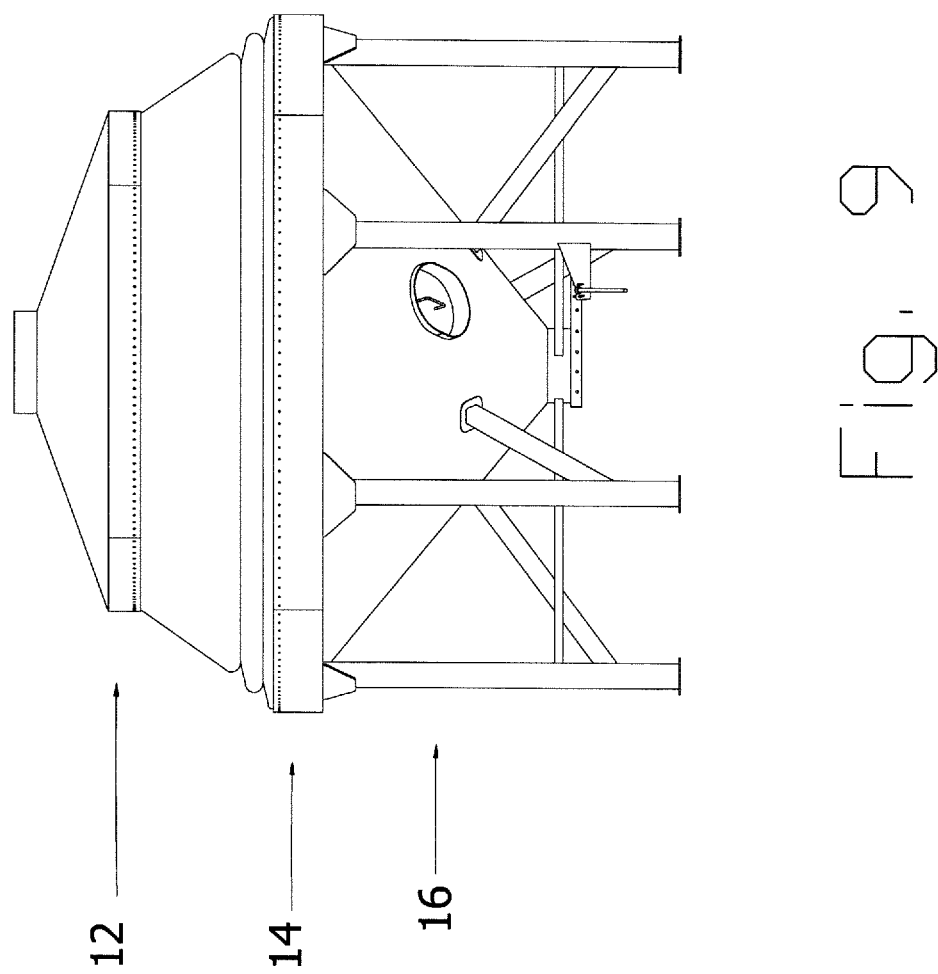

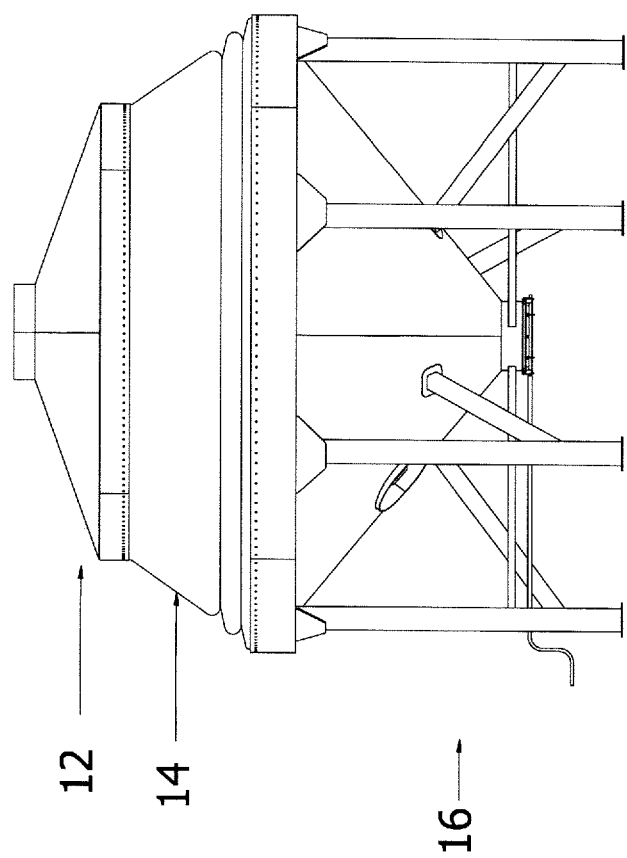

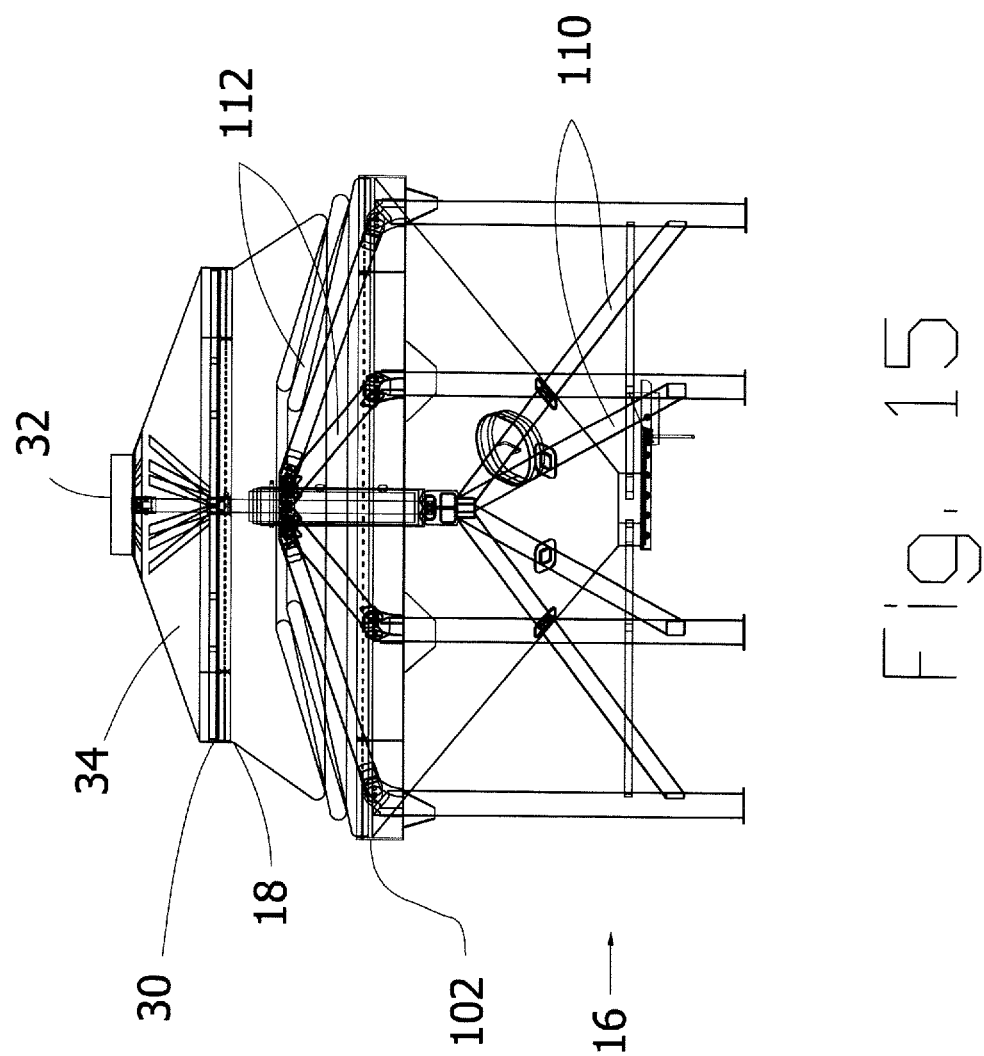

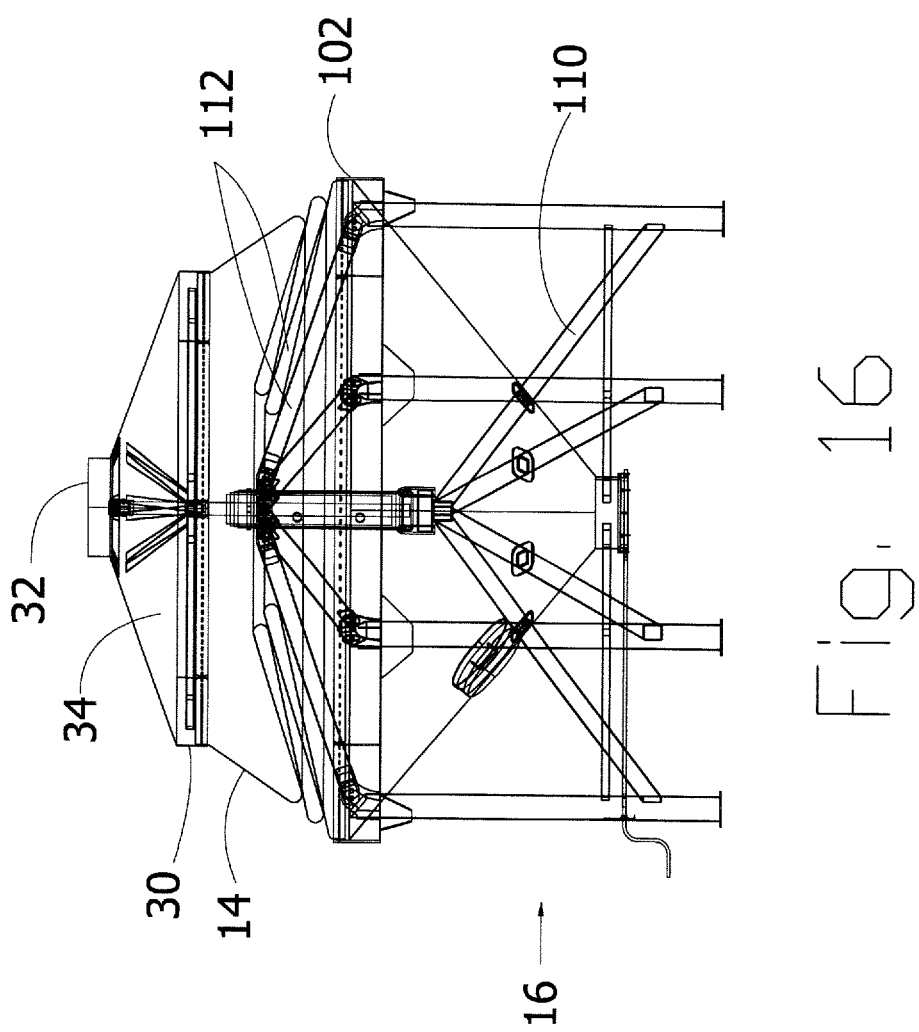

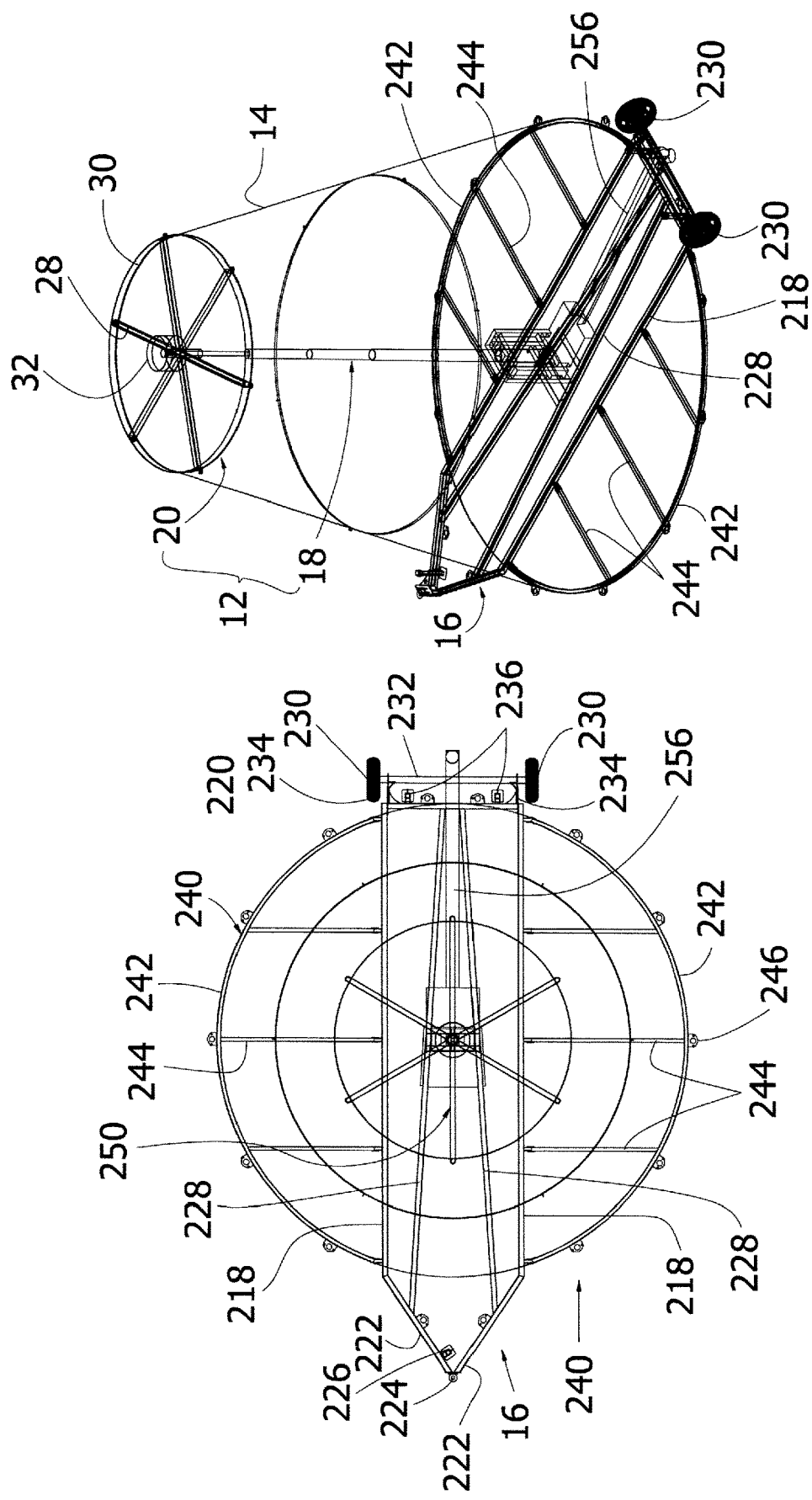

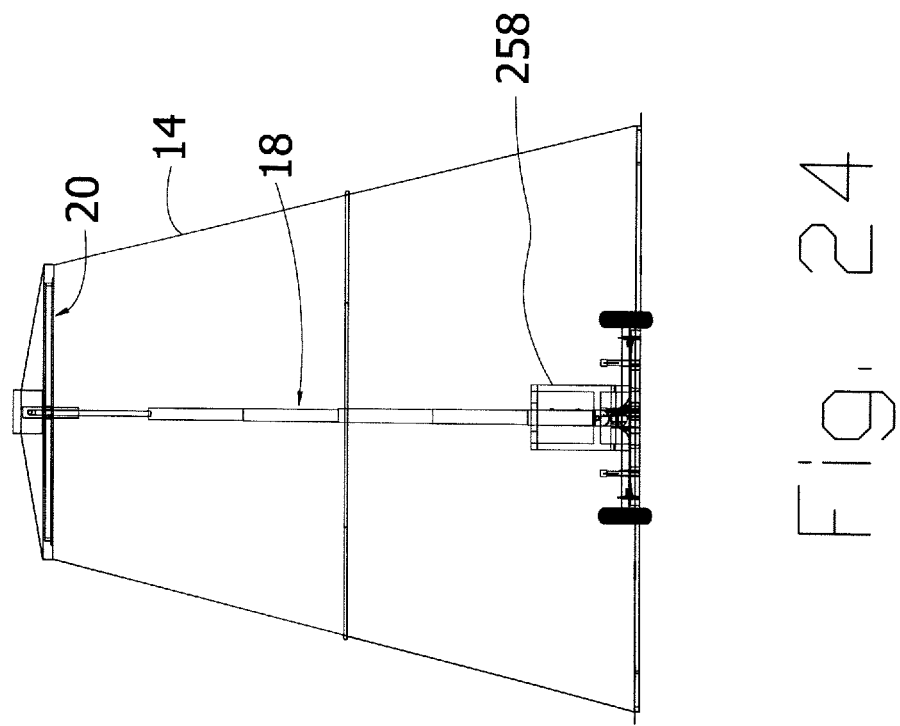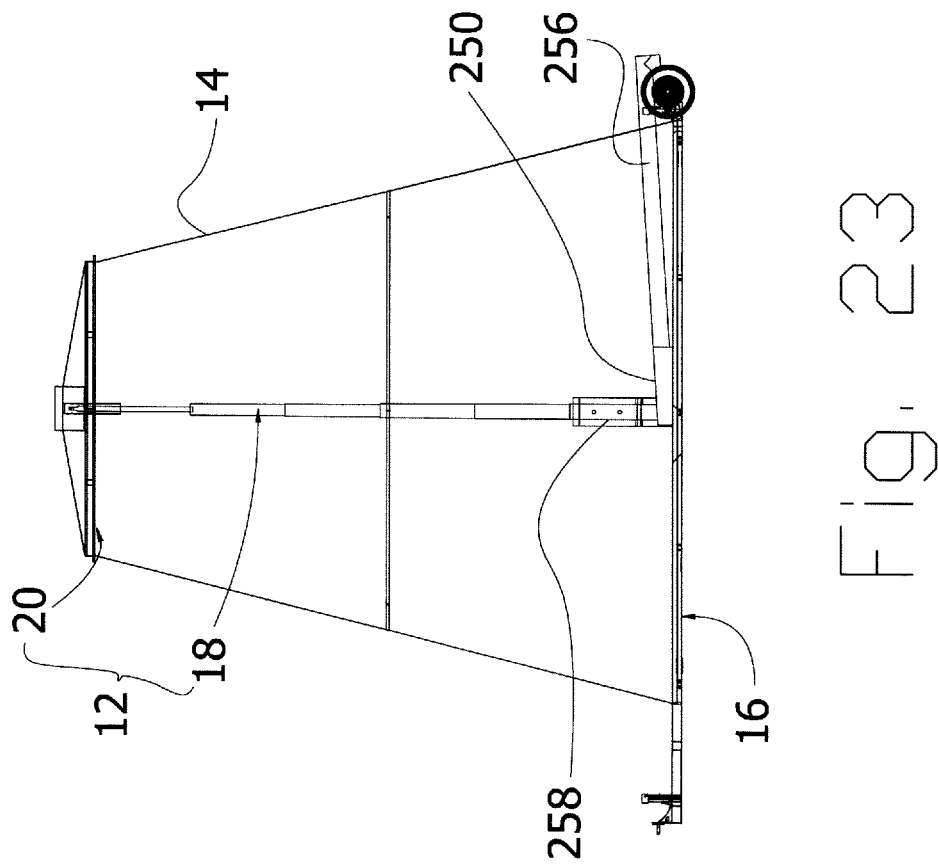

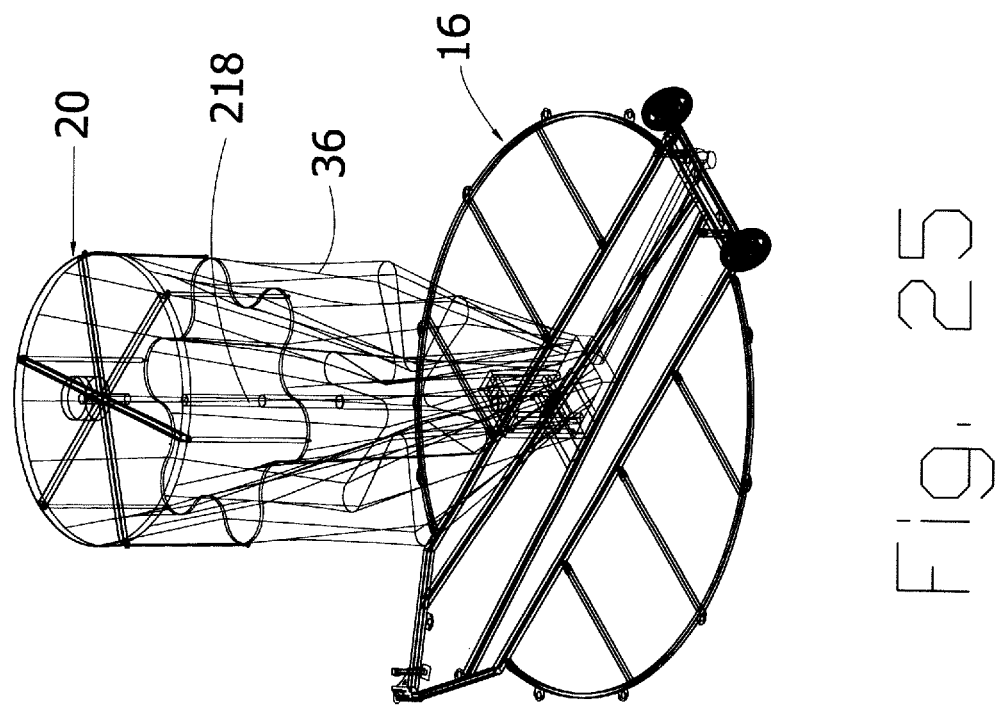
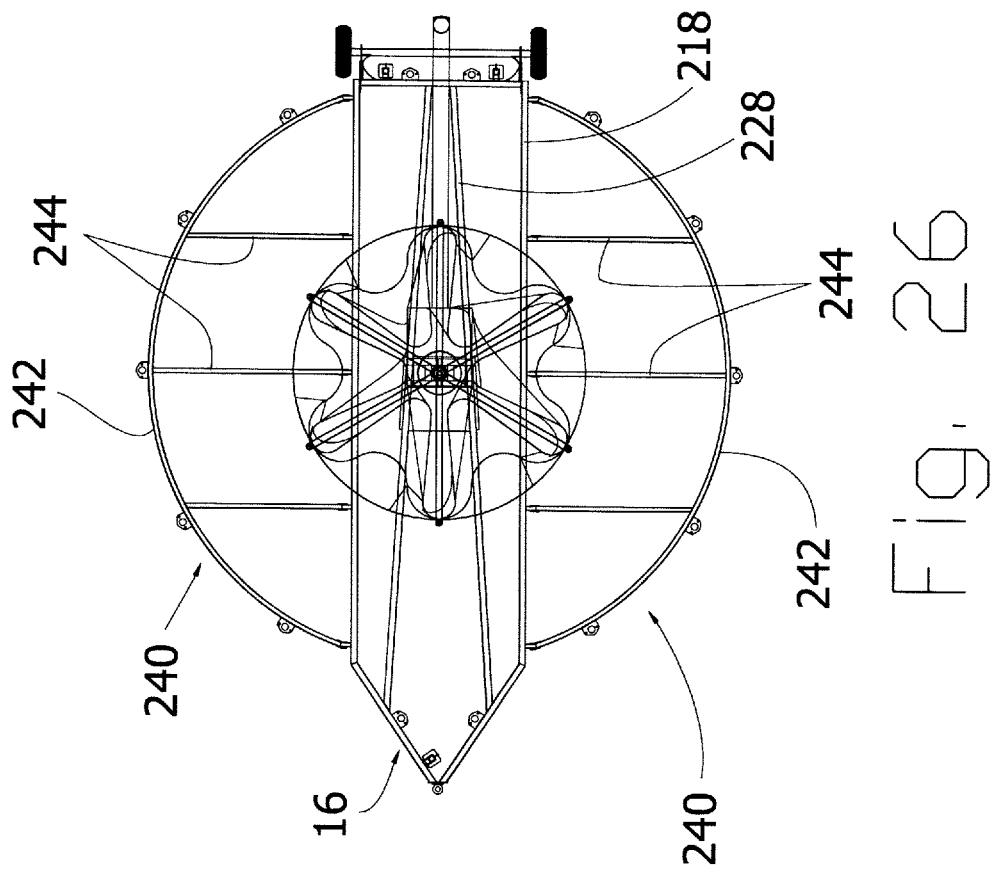

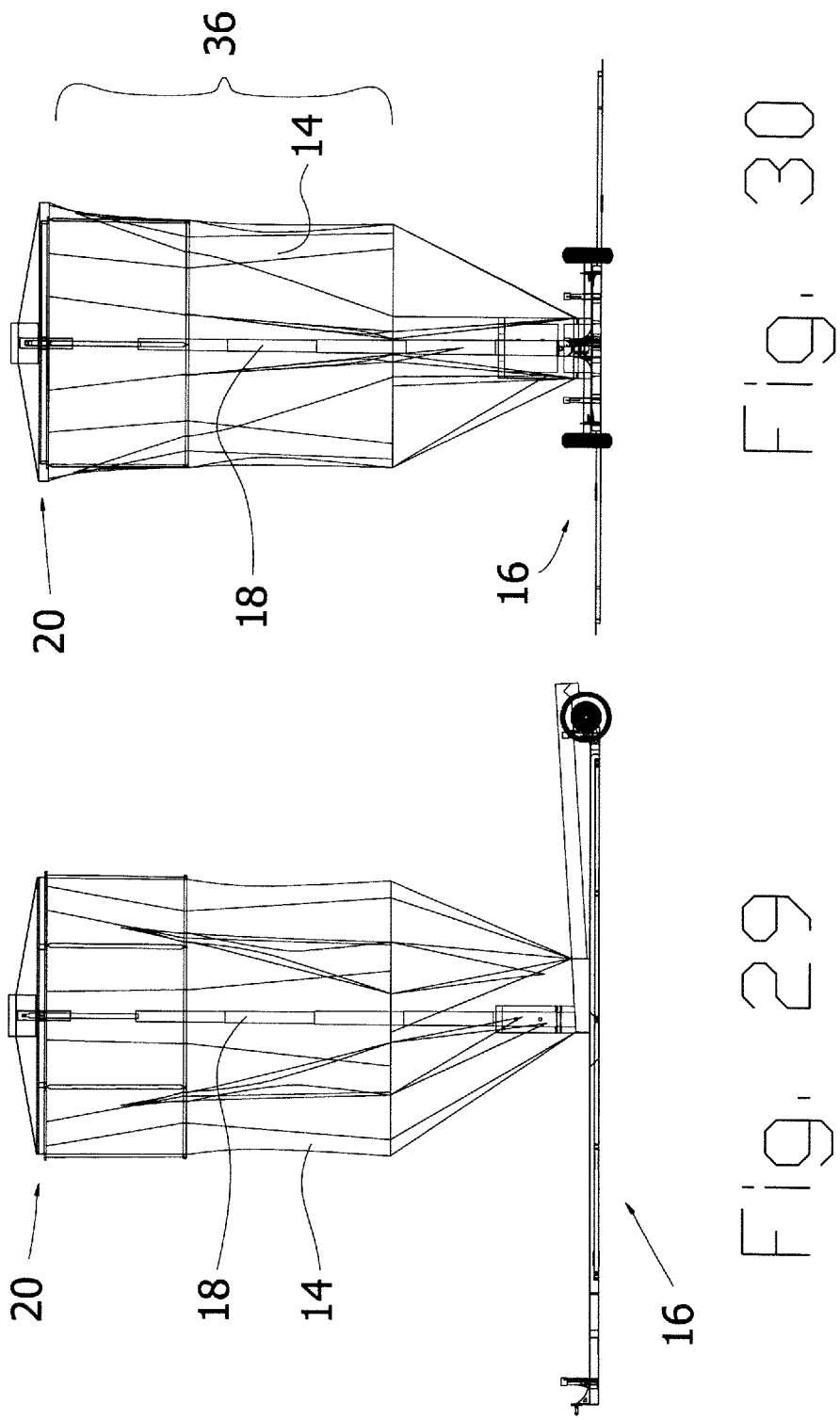

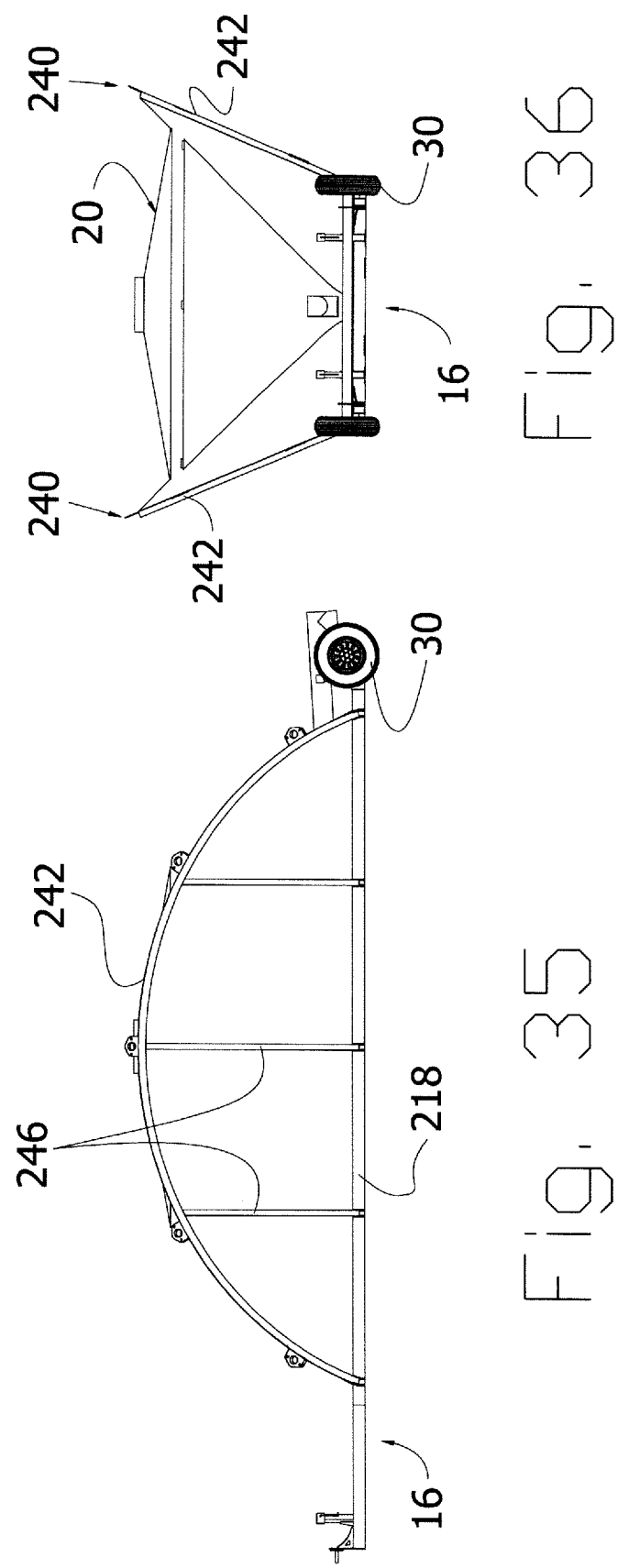

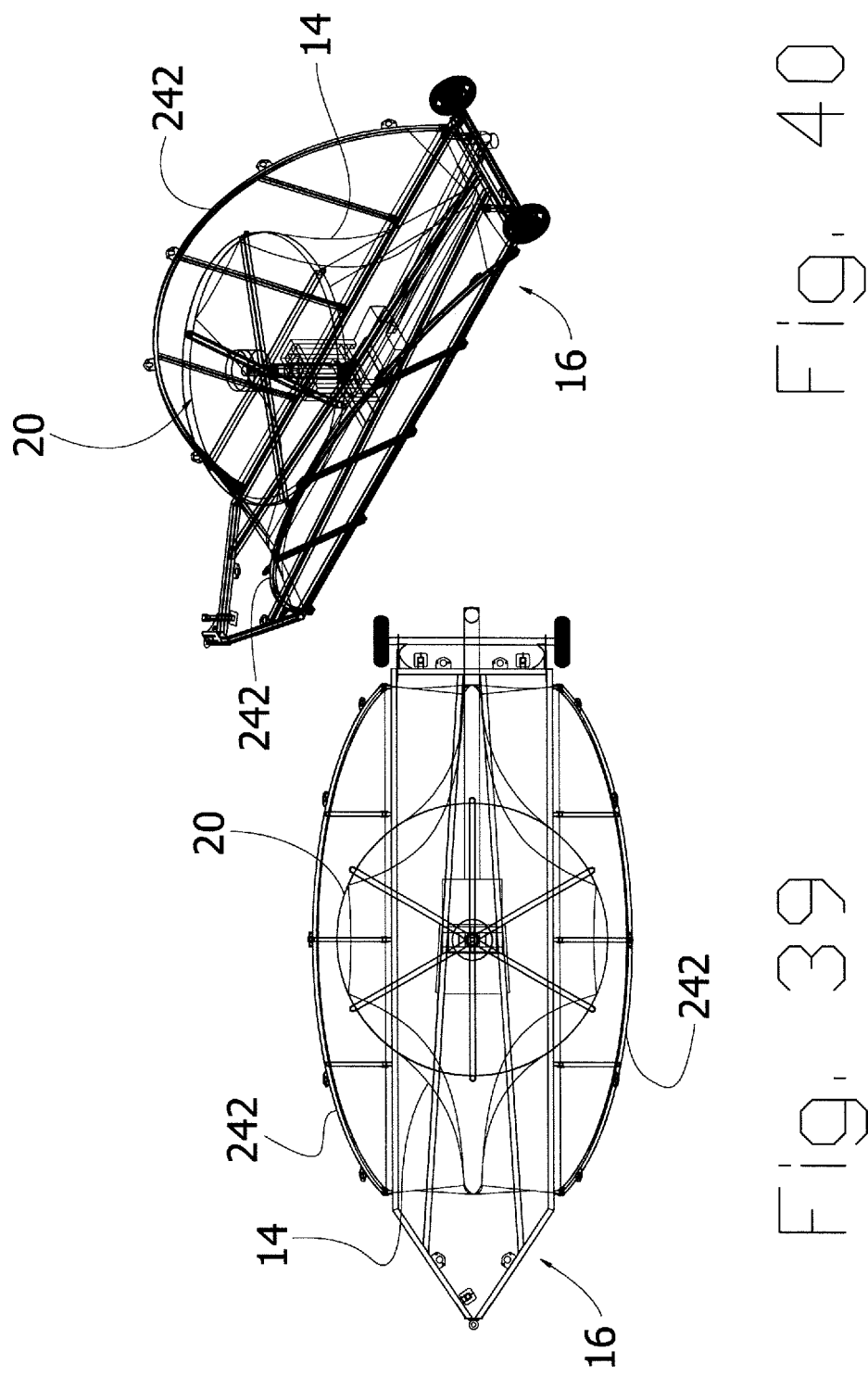

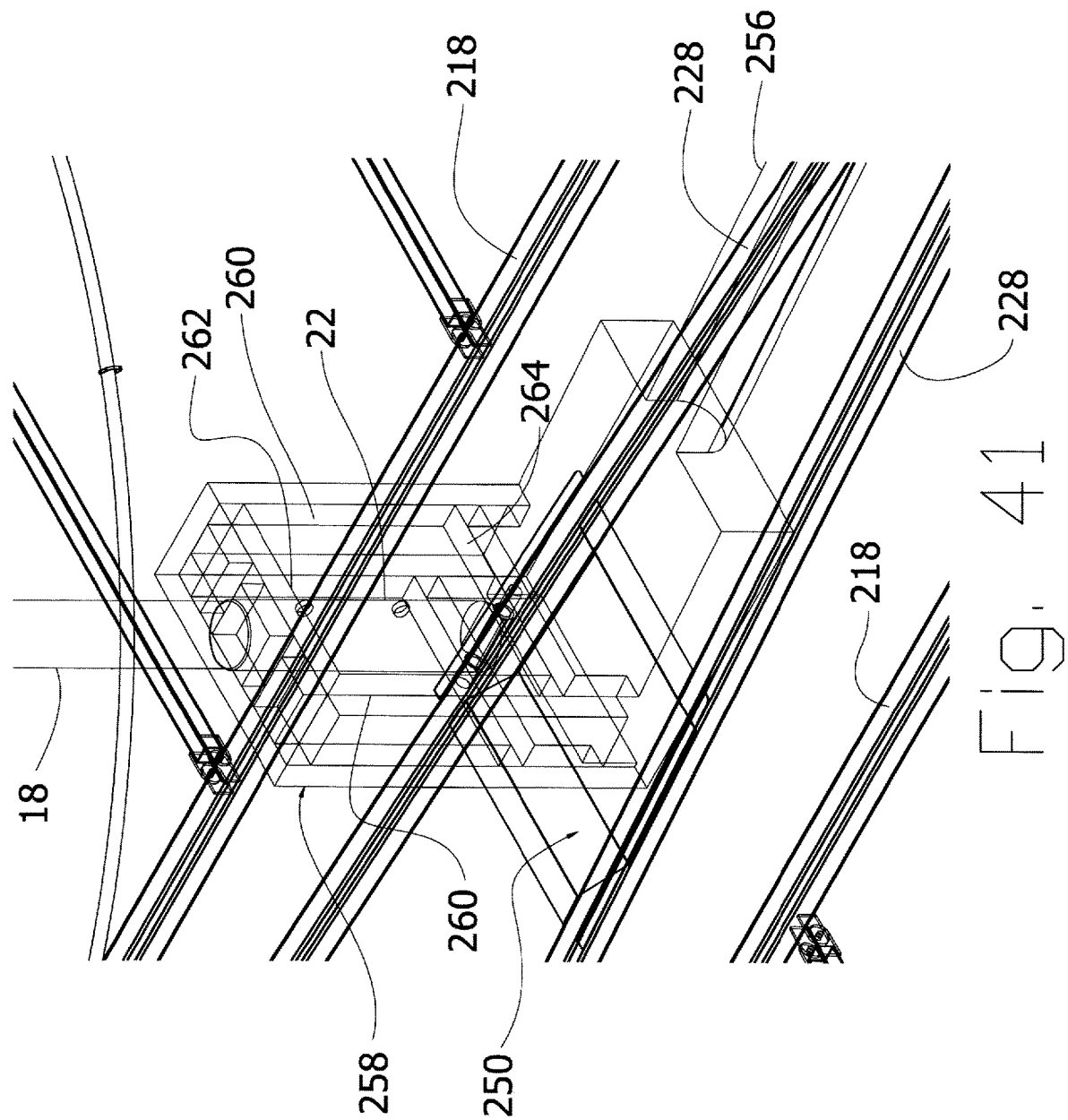

PORTABLE COLLAPSABLE STORAGE BIN AND UNLOADING SYSTEM

This application claims foreign priority benefits from Canadian Patent Application No. 2,989,632, filed Dec. 20, 2017.

FIELD OF THE INVENTION

The present invention relates to a particulate material storage bin, for example a grain silo, which can be collapsed for transport. More particularly, the present invention relates to a collapsible storage bin including a rigid frame structure supporting a flexible storage envelope thereon.

BACKGROUND

It is common to store various materials including grain, granular fertilizer, and other particulate materials in grain storage bins or silos. In some instances, a storage bin or silo is only required for temporary use at a given location; however, a typical storage bin is large in size and includes a rigid cylindrical side wall of large diameter so as to be difficult to transport between different locations. Although some attempts have been made in the prior art to provide a portable storage bin, such bins are either small and limited in size, or remain complex and time consuming to assemble at the storage location.

Even when using a storage bin temporarily at a given location, it is still desirable to be able to efficiently load and unload the storage bin. More permanent bins are commonly provided with either a rigid hopper bottom for discharging to a central discharge location, or a bin sweep to gather material to a central discharge location. Neither system is well suited to portability however due to the large rigid floor requirements in each instance.

SUMMARY OF THE INVENTION

According to one aspect of the invention there is provided a portable storage bin comprising:

a base frame for being supported on a ground surface;

a bin support frame supported on the base frame so as to be operable between a working position and a transport position in which the base frame is reduced in height relative to the base frame in the transport position relative to the working position; and a storage envelope supported on the bin support frame to define a storage chamber for storing particulate material therein in the working position of the bin support frame, in which the storage envelope is collapsible with the bin support frame from the working position to the transport position.

By providing a frame structure supporting an envelope thereon, a simple structure can be easily and efficiently deployed from a transport position to a working position so as to be well suited for use as a temporary storage bin or silo.

Preferably the storage envelope is formed of a pliable material.

The bin support frame preferably includes (i) an upper frame portion above the base frame from which the storage envelope is suspended in the working position and (ii) a central support post extending between base frame and the upper frame portion which is extendable in height for raising the upper frame portion relative to the base frame from the transport position to the working position.

The central support post preferably comprises a plurality of telescoping sections (for example a multi-section hydraulic piston cylinder arrangement, or a pulley and cable actuated series of nesting tubes) such that a height of the bin support frame in the transport position is less than half of a height of the bin support frame in the working position.

The upper frame portion preferably includes an annular frame member defining a perimeter of the storage envelope at a top end thereof from which an upright perimeter wall of the storage envelope is suspended.

The upright perimeter wall of the storage envelope preferably increases in diameter from the top end to a bottom end supported on the base frame such that the upright perimeter wall of the storage envelope is frustoconical in shape.

The bin may further comprise: (i) an inlet collar defining a loading opening therethrough supported at a location spaced above and centrally relative to the annular frame member, and (ii) a top wall which is conical in shape, spanning between the inlet collar and the annular frame member for enclosing a top end of the storage envelope. The upper frame portion may further include a plurality of radial frame members spanning radially between a top end of the central support post and the annular frame member, in which the inlet collar is supported above the radial frame members.

According to one embodiment, the base frame may be supported on wheels for rolling movement along the ground surface in a forward rolling direction. In this instance, the base frame may be operative to be reduced in lateral width perpendicular to the forward rolling direction in the transport position relative to the working position. The base frame may include a main frame portion and at least one wing frame portion which is foldable about an axis oriented in the forward rolling direction relative to the main frame portion between the transport position and the working position of the bin support frame for reducing the lateral width in the transport position relative to the working position.

When the base frame includes a flat bottom side for engaging the ground surface and wheels which are movable in height relative to the base frame between a transport position in which at least a portion of the wheels protrude below the flat bottom side of the base frame to support the base frame for rolling movement along the ground surface and a working position in which the wheels are raised in height relative to the transport position.

In some embodiments, the base frame may also include a sump pit supported thereon in which the sump pit has a bottom and rigid perimeter walls extending upwardly from the bottom to an upper perimeter edge surrounding a top opening of the sump pit. In this instance, the storage envelope may be joined to the perimeter walls of the sump pit such that a hollow interior of the storage envelope is in open communication with the sump pit through the top opening of the sump pit.

Preferably an unloading auger communicates between the sump pit and a perimeter of base frame, in which the unload auger is located externally of the storage envelope.

When the bin support frame comprises (i) an upper frame portion above the base frame from which the storage envelope is suspended in the working position and (ii) a central support post extending between base frame and the upper frame portion which is extendable in height for raising the upper frame portion relative to the base frame from the transport position to the working position, preferably a fixed support frame is joined between the base frame and a bottom end of the central support post such that the central support post is located spaced above the sump pit.

In the instance of a central sump pit, the storage envelope in the working position preferably defines a bottom wall engaged upon the base frame and a perimeter wall suspended from the bin support frame to extend upwardly from a perimeter of the bottom wall towards a top end of the bin support frame. Preferably the bin support frame in this instance is operable from the working position to an unloading position in which the bin support frame is increased in height from the base frame in the unloading position relative to the working position. In this manner, the storage envelope can be suspended from the bin support frame in the unloading position such that (i) the bottom wall of the storage envelope is suspended from the bin support frame with the perimeter wall of the storage envelope, and (ii) a portion of the bottom wall of the storage envelope that is joined to the perimeter walls of the sump pit defines a lowermost portion of the storage envelope.

Preferably the bottom wall of the storage envelope is generally flat and circular in the working position and the perimeter wall of the storage envelope spans a full height of the storage envelope between the bottom wall and a top end of the storage envelope in the working position.

According to an alternative embodiment, the base frame may further comprise (i) a rigid hopper cone tapering downwardly and inwardly from an upper perimeter edge to a central discharge at a bottom end of the cone, and (ii) a plurality of support members extending downwardly from the upper perimeter edge of the cone to a bottom end of the base frame so as to support the central discharge of the cone spaced above the ground surface when the support members are engaged upon the ground surface.

When the bin support frame comprises an upper frame portion above the base frame from which the storage envelope is suspended in the working position and a central support post extending between base frame and the upper frame portion which is extendable in height, preferably a bottom end of the central support post is fixedly joined to the base frame at a location spaced above the central discharge.

The bin support frame may further include (i) a plurality of lower radial spokes extending at an intermediate location through the cone between the bottom end of the central support post and the support members respectively, and/or (ii) a plurality of upper radial spokes received internally within the storage envelope in which the upper radial spokes each extend upwardly and radially inwardly from the upper perimeter edge of the cone to the central support post.

BRIEF DESCRIPTION OF THE DRAWINGS

Some embodiments of the invention will now be described in conjunction with the accompanying drawings in which:

FIG. 3 is a perspective view of the bin according to FIG. 1;

FIG. 4 is a top plan view of the bin according to FIG. 1;

FIG. 5 is a front elevational view of the storage bin according to the first embodiment of FIG. 1 in which various components are shown to be transparent for illustrative purposes;

FIG. 6 is a side elevational view of the bin according to FIG. 5;

FIG. 7 is a perspective view of the bin according to FIG. 5;

FIG. 8 is a top plan view of the bin according to FIG. 5;

FIG. 9 is a front elevational view of the storage bin according to the first embodiment of FIG. 1, shown collapsed in the transport position;

FIG. 10 is a side elevational view of the bin according to FIG. 9;

FIG. 15 is a front elevational view of the bin according to FIG. 13;

FIG. 16 is a side elevational view of the bin according to FIG. 13;

FIG. 21 is a top plan view of the storage bin according to the second embodiment of FIG. 17, in which various components are shown to be transparent for illustrative purposes;

FIG. 22 is a perspective view of the bin according to FIG. 21;

FIG. 23 is a side elevational view of the bin according to FIG. 21;

FIG. 24 is a rear elevational view of the bin according to FIG. 21;

FIG. 25 is a perspective view of the bin according to the second embodiment of FIG. 17, shown in an unloading position, and which various components are shown to be transparent for illustrative purposes;

FIG. 26 is a top plan view of the bin according to FIG. 25;

FIG. 29 is a side elevational view of the bin according to FIG. 25;

FIG. 30 is a rear elevational view of the bin according to FIG. 25;

FIG. 35 is a side elevational view of the bin according to FIG. 33;

FIG. 36 is a rear elevational view of the bin according to FIG. 33;

FIG. 39 is a top plan view of the bin according to FIG. 37;

FIG. 40 is a perspective view of the bin according to FIG. 37;

FIG. 41 is an enlarged portion of FIG. 25 so as to better illustrate the fixed frame connecting the bottom end of the central support post and the base frame their below.

In the drawings like characters of reference indicate corresponding parts in the different figures.

DETAILED DESCRIPTION

Figure 1:
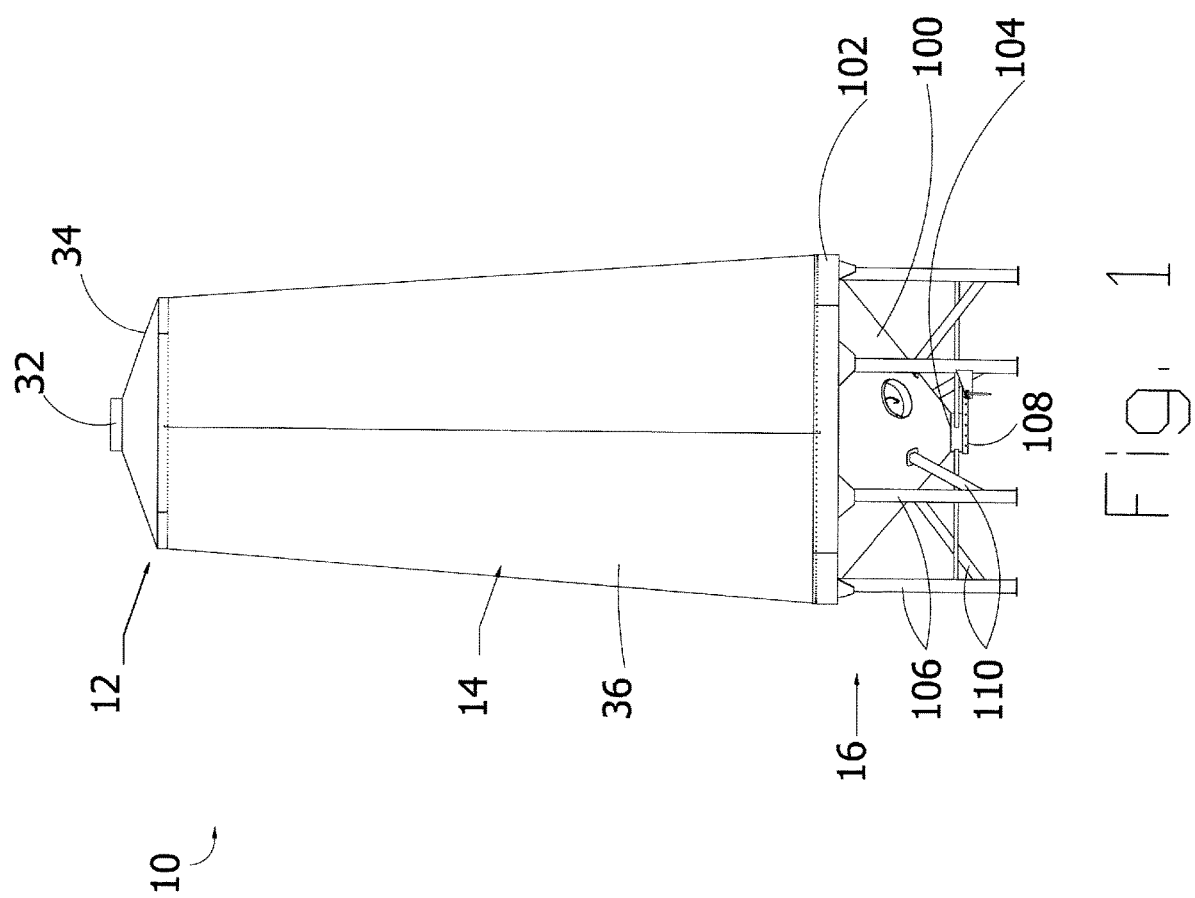
FIG. 1 is a front elevational view according to a first embodiment of the storage bin in a working position.
Figure 2:
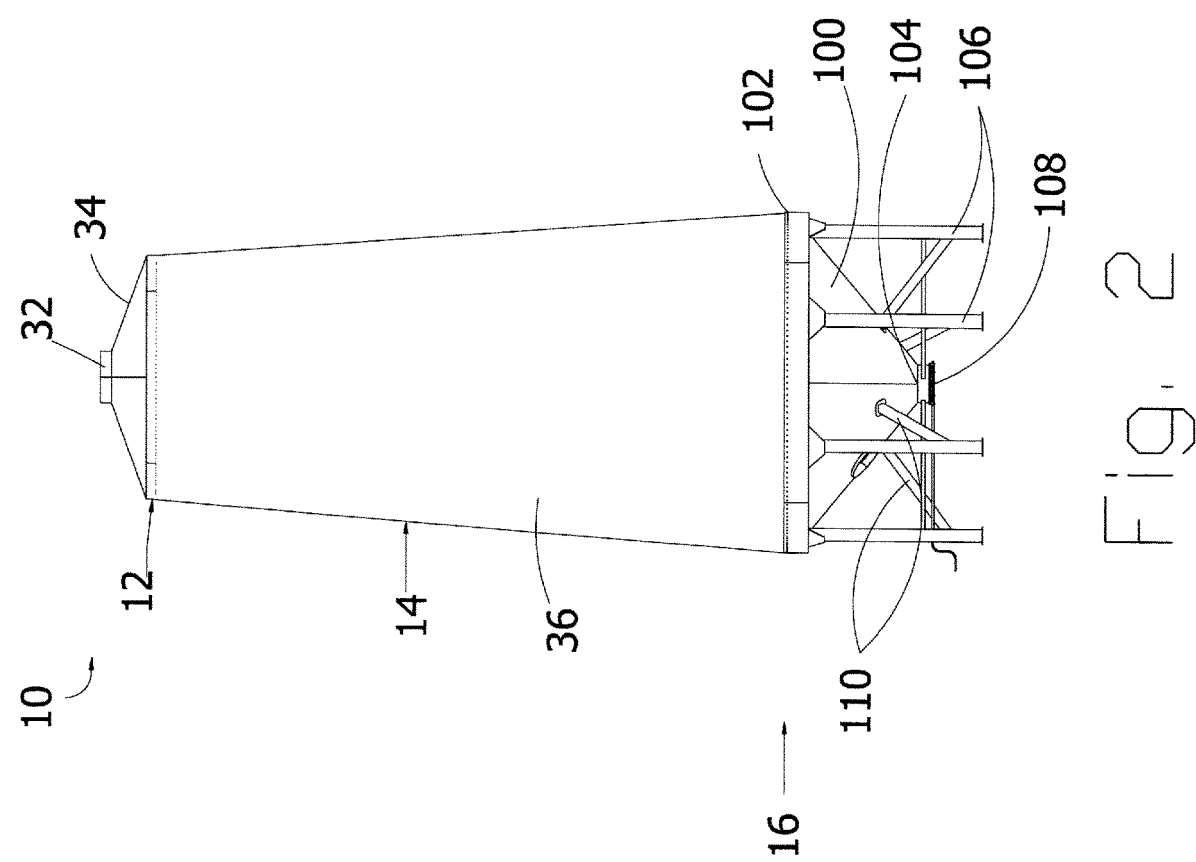
FIG. 2 is a side elevational view of the bin according to FIG. 1.
Figure 12:
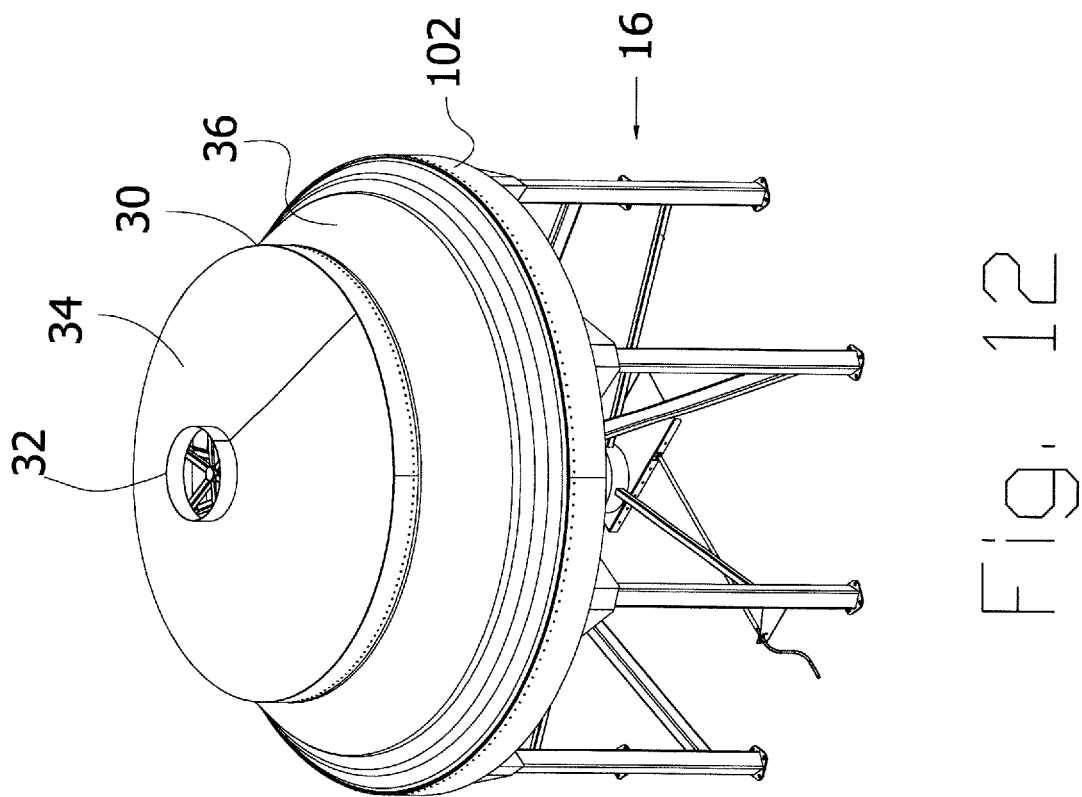
FIG. 12 is a perspective view of the bin according to FIG. 9.
Figure 11:
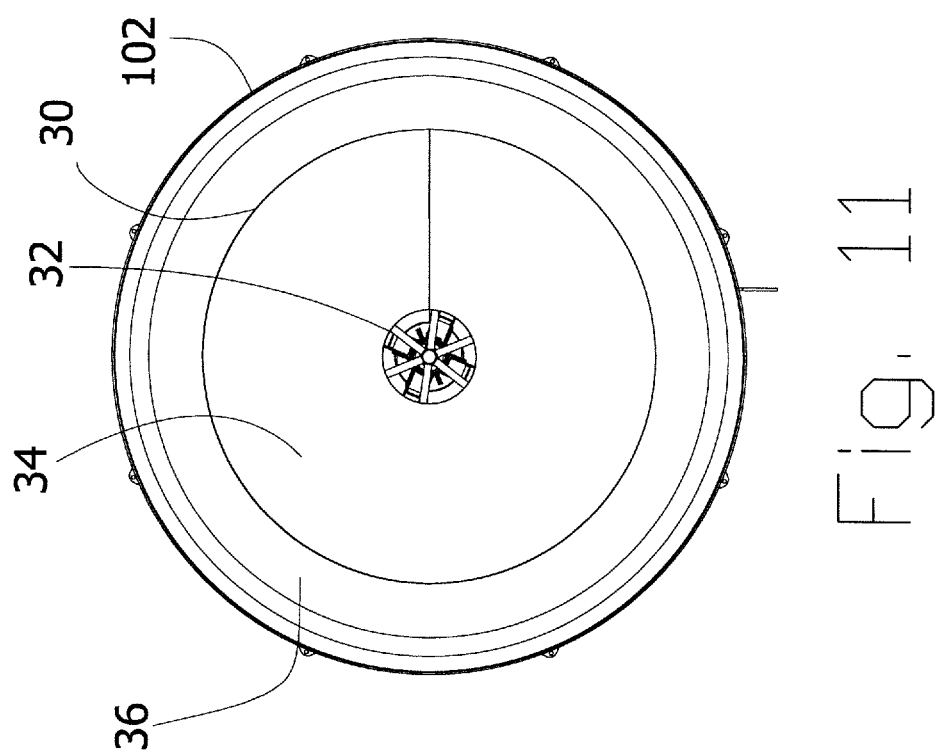
FIG. 11 is a top plan view of the bin according to FIG. 9.
Figure 14:
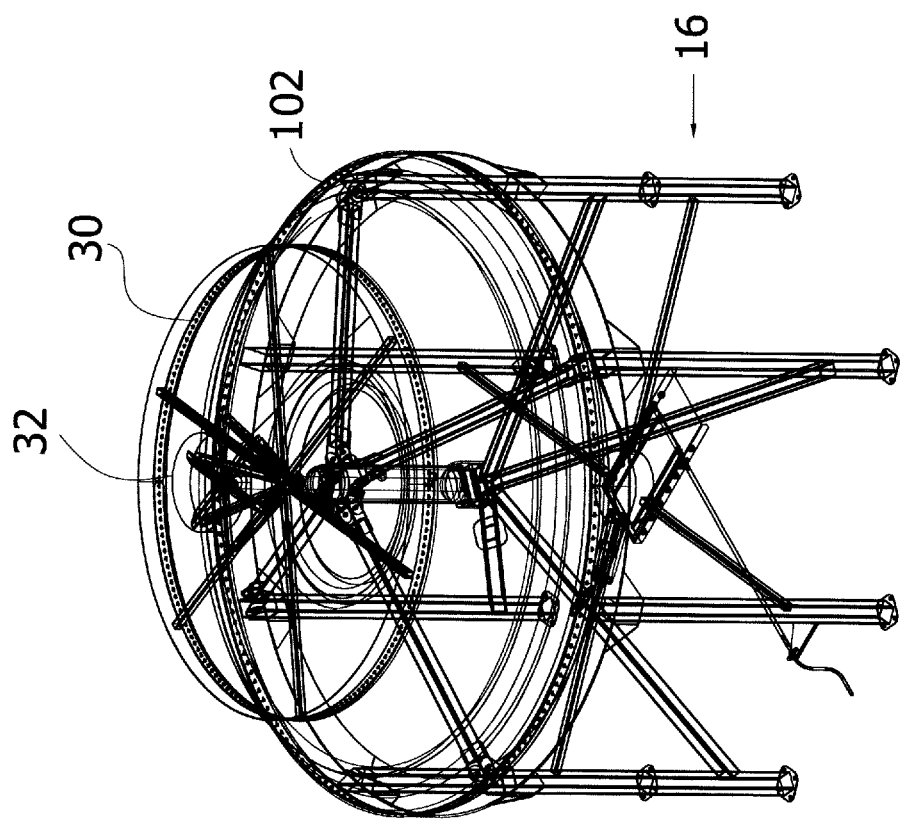
FIG. 14 is a perspective view of the bin according to FIG. 13.
Figure 13:
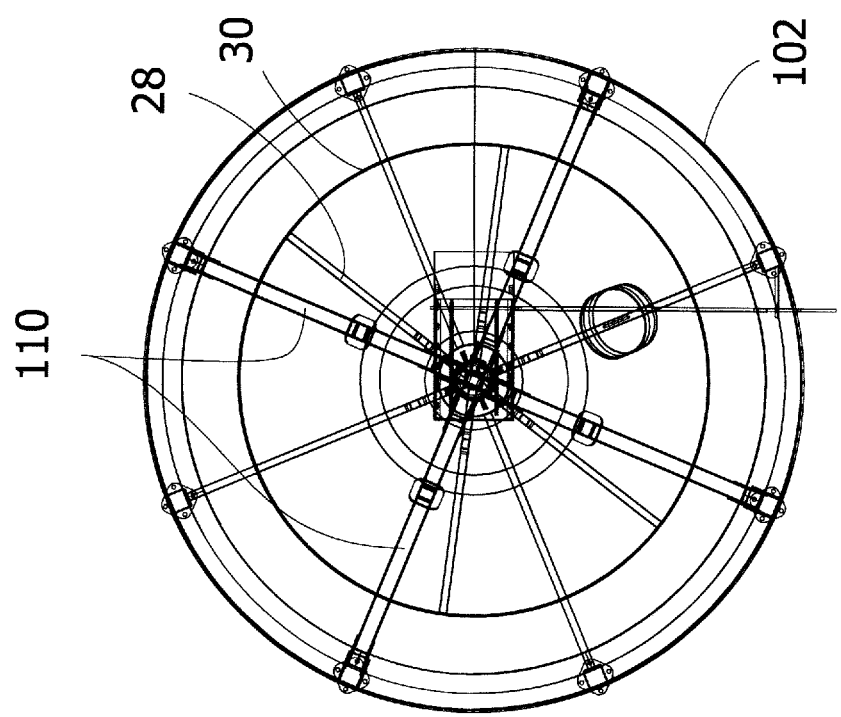
FIG. 13 is a top plan view of the storage bin according to the first embodiment of FIG. 1 in which various components are shown to be transparent for illustrative purposes.
Figure 17:
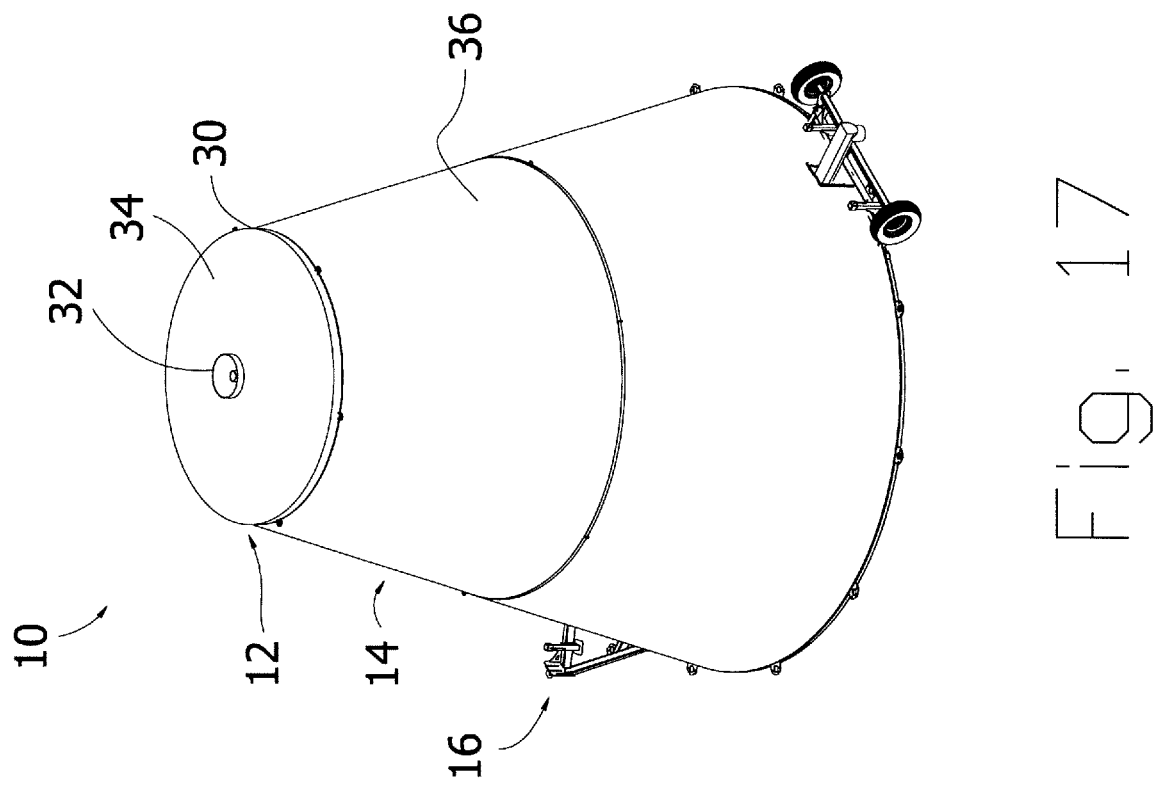
FIG. 17 is a perspective view of the storage bin according to a second embodiment, shown in a working position.
Figure 18:
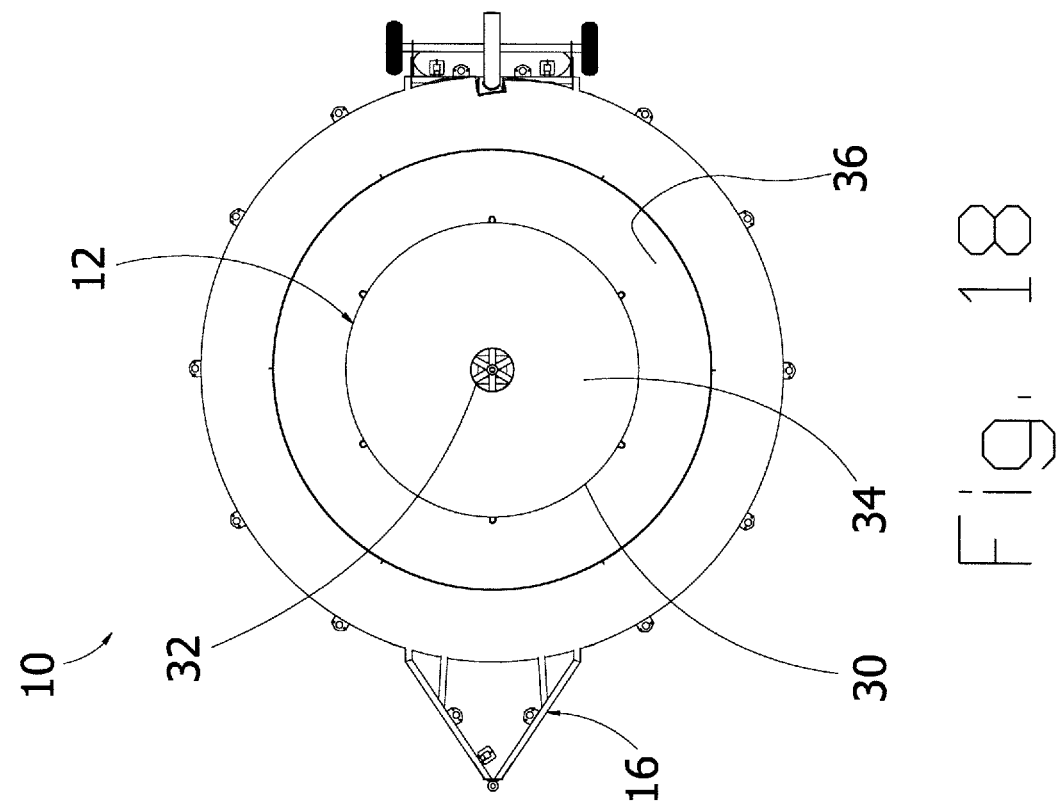
FIG. 18 is a top plan view of the bin according to FIG. 17.
Figure 19:
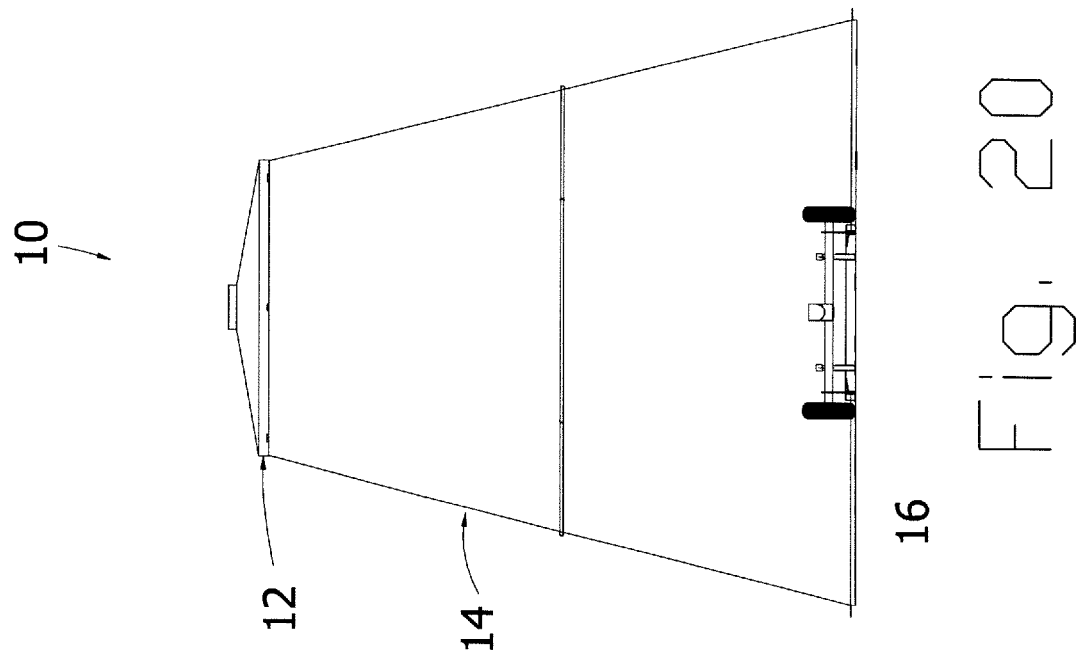
FIG. 19 is a side elevational view of the bin according to FIG. 17.
Figure 20:
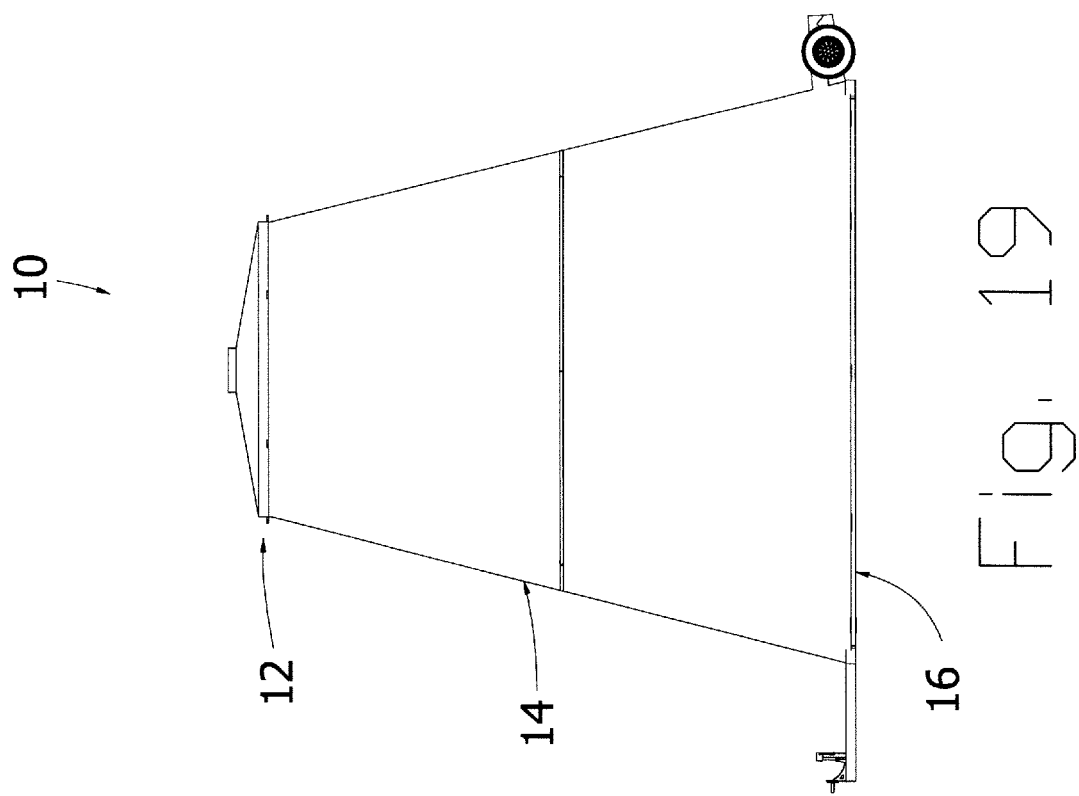
FIG. 20 is a rear elevational view of the bin according to FIG. 17.
Figure 28:
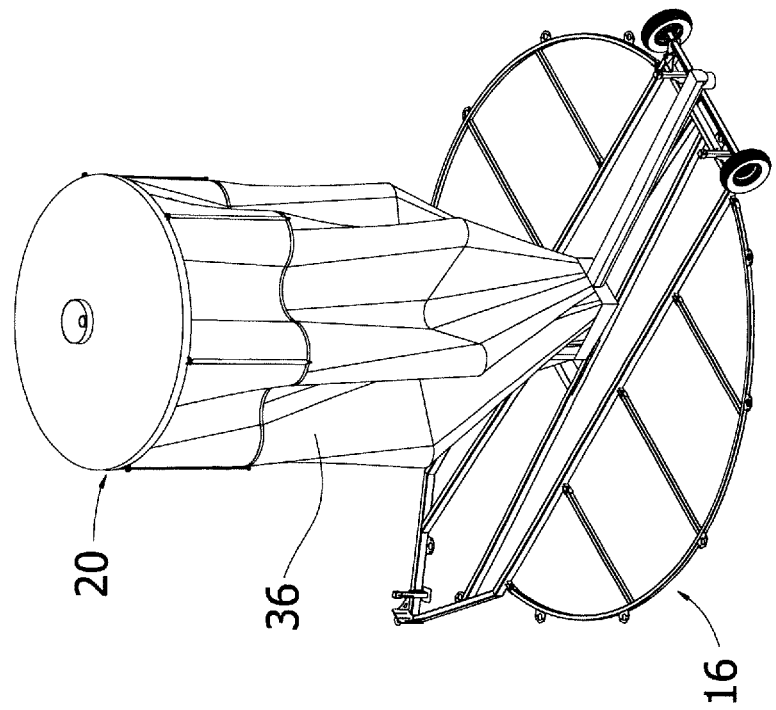
FIG. 28 is a perspective view of the bin according to FIG. 27.
Figure 27:
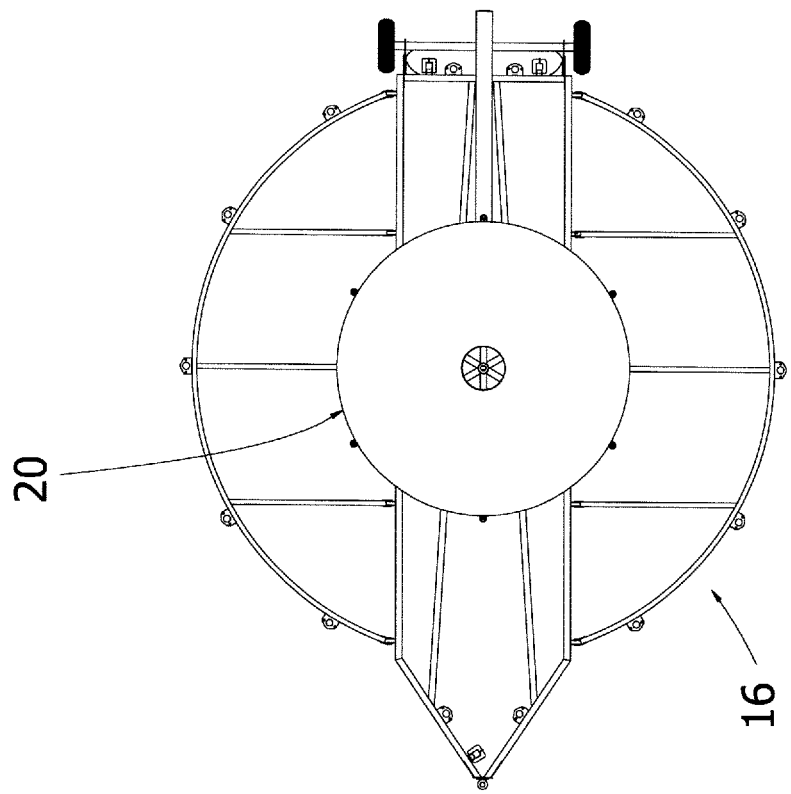
FIG. 27 is a top plan view of the bin according to FIG. 25 in the unloading position, in which the components are no longer shown to be transparent.
Figure 31:
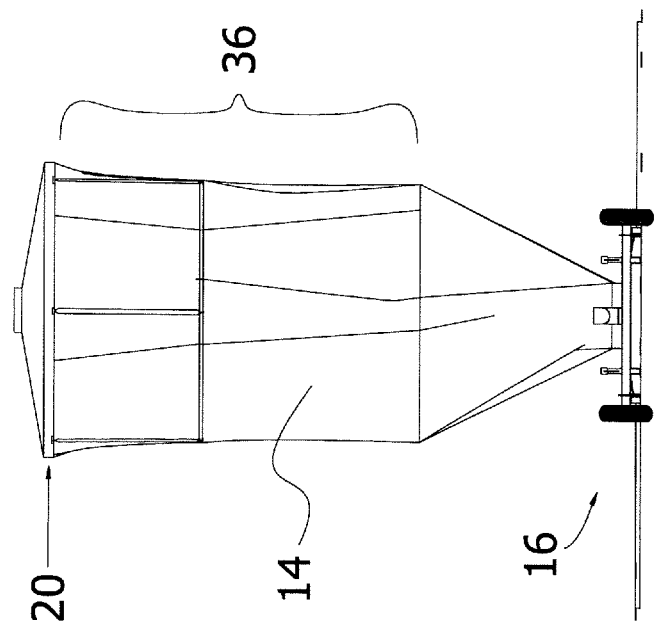
FIG. 31 is a side elevational view according to FIG. 27.
Figure 32:
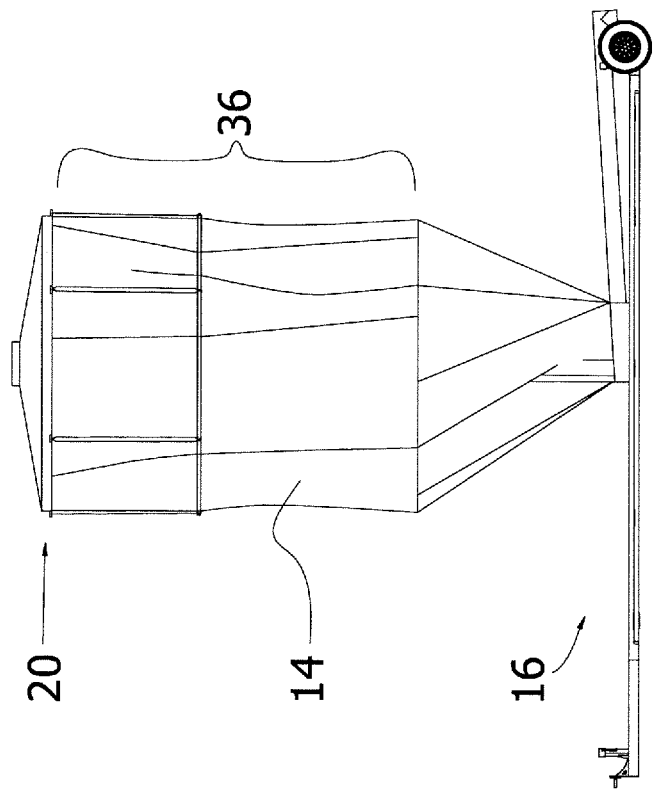
FIG. 32 is a rear elevational view of the bin according to FIG. 27.
Figures 33, 34:
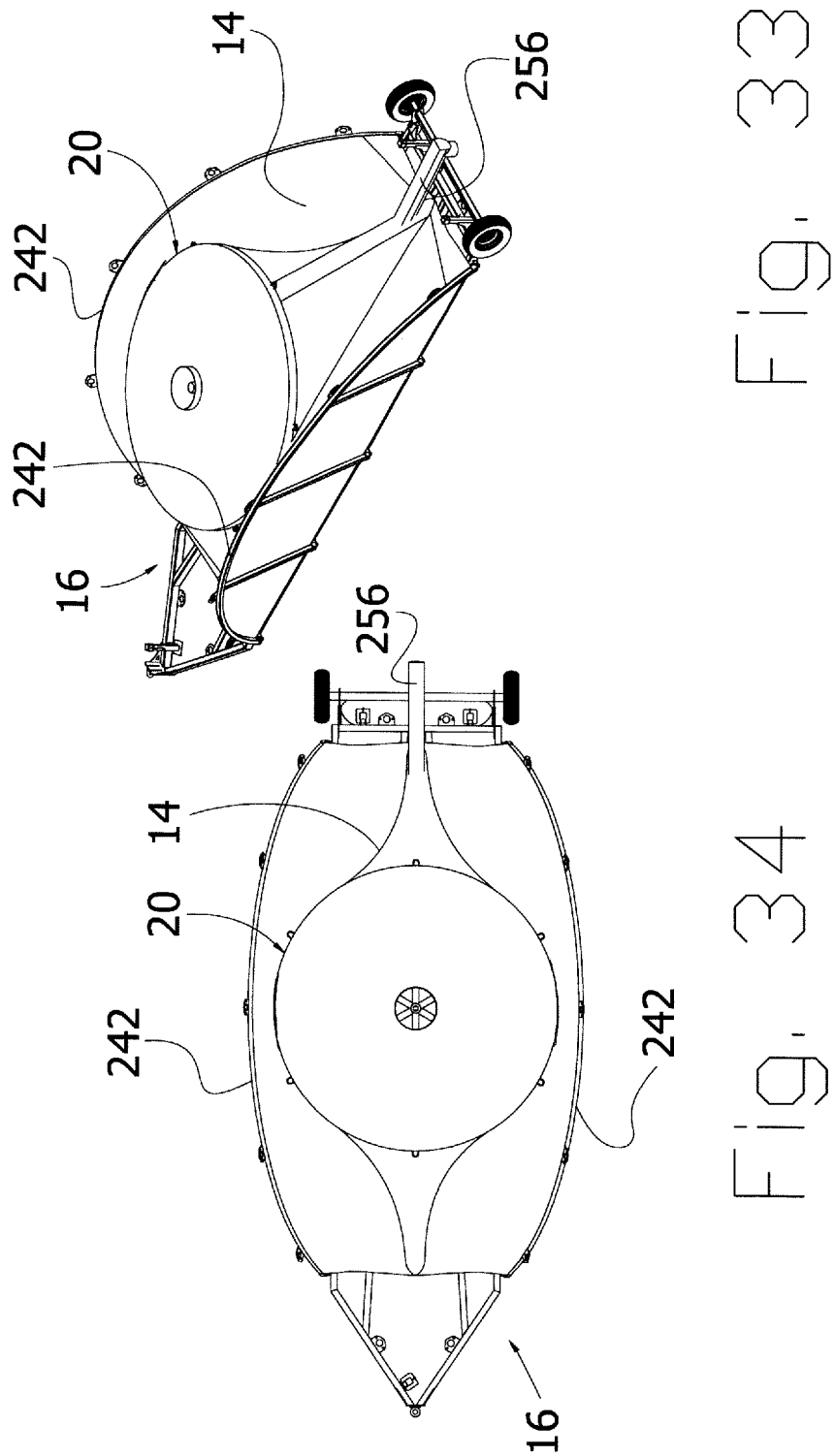
FIG. 33 is a perspective view of the bin according to the second embodiment of FIG. 17, shown in the transport position.
FIG. 34 is a top plan view of the bin according to FIG. 33.
Figure 38:
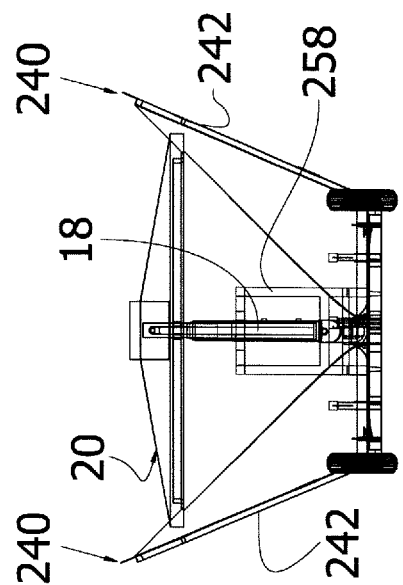
FIG. 38 is a rear elevational view of the bin according to FIG. 37.
Figure 37:
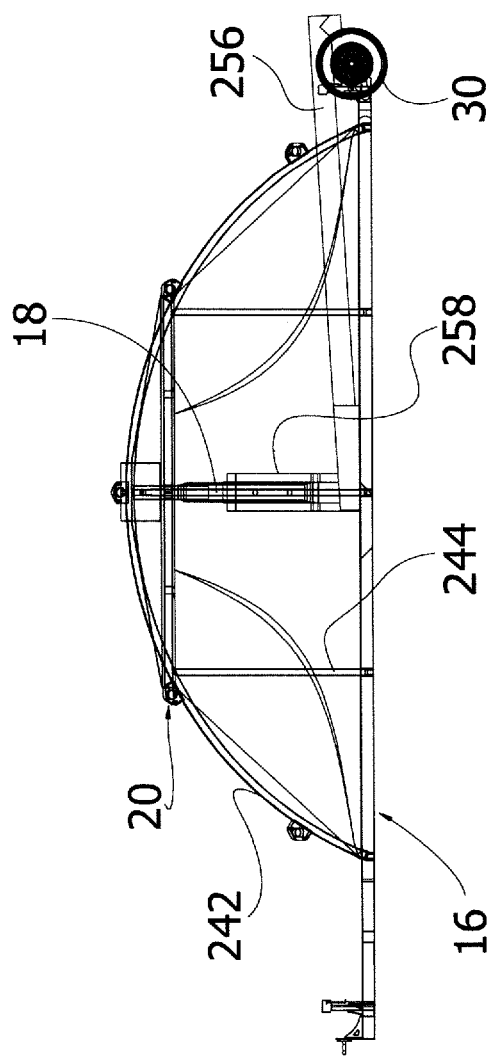
FIG. 37 is a side elevational view of the bin according to FIG. 33, in which some of the components are shown to be transparent for illustrative purposes.
Figure 42:
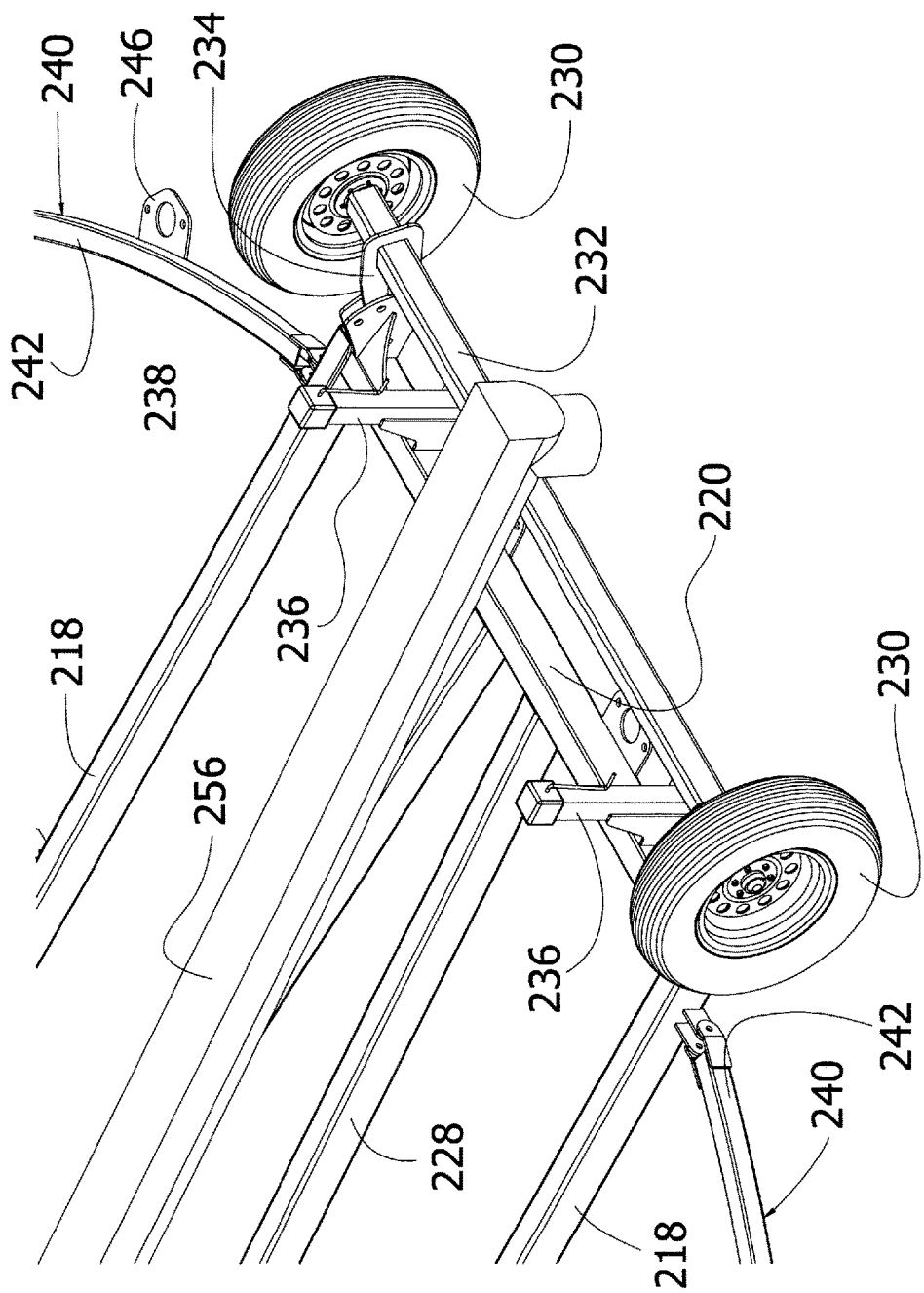
FIG. 42 is an enlarged portion of FIG. 25 so as to better illustrate the height adjustment of the wheels relative to the base frame.

Referring to the accompanying figures there is illustrated a portable storage bin generally indicated by reference numeral 10. The storage bin 10 generally includes a bin support frame 12 supporting a flexible envelope 14 thereon such that the envelope is movable with the bin support frame so as to be readily collapsible from a working position defining a storage chamber for receiving particulate materials, for example grain, stored therein to a transport position in which the storage bin is collapsed so as to be reduced in height and lateral dimension to be better suited for transport between different storage locations.

The storage envelope 14 comprises a flexible envelope defining a storage chamber therein in the working position. The envelope is formed of a pliable, flexible, durable material, for example comprising various woven materials, canvas materials, plastic materials or a composite thereof.

In each instance, the storage bin 10 includes a base frame 16 upon which the bin support frame is supported such that the bin support frame is movable relative to the base frame between the transport and working positions respectively.

Although two embodiments storage bin 10 are illustrated in accompanying figures, the common features of the various embodiments will first be described.

In each instance the bin support frame 12 includes a central support of post 18 and an upper frame portion 20 supported at the top end of the central support post so as to be adjustable in height relative to the base frame 16 as the central support post 18 is extended and retracted in length.

The central support post 18 is a telescoping member including a bottom section 22 at the bottom end thereof, a top section 24 at the top end thereof and a plurality of intermediate sections 26 connected in series between the top and bottom sections so as to be slidable relative to one another in a telescoping manner.

In the preferred embodiment, the central support post comprises a hydraulic actuator. In further embodiments, however, the telescoping sections of the central support post may be extended and retracted by various commercially available actuation systems including cable and pulley systems for example. In either instance, the bottom section 22 is intended to be mounted in fixed relation to the base frame 16 while the top section is movable relative to the bottom section through a sufficient range that the overall height of the upper frame portion 20 from the base frame 16 in the transport position is less than half the height of the upper frame portion 20 relative to the base frame 16 in the working position.

The upper frame portion 20 is mounted in fixed relation to the top section of the central support post. A plurality of radial spokes 28 are supported within a common plane to extend radially outward from respective inner ends fixed onto the top section of the central support post to respective outer ends which are connected to an annular frame member 30. The annular frame member 30 is supported concentrically about the central support post and lies in a common plane with the radial spokes 28 such that the common plane is oriented perpendicularly to a vertical axis of the central support post.

The annular frame member 30 defines a perimeter of the storage envelope at the top end thereof. The upper frame portion further includes an inlet collar 32 which is mounted concentrically in relation to the central support post. The inlet collar is larger in diameter than the central support post to define an annular gap between the inlet collar 32 and the top section of the central support post for receiving particulate material therethrough as it is loaded into the storage bin. The inlet collar is engaged upon the top side of the radial spokes to extend upwardly therefrom to an open top end spaced above the plane of the radial spokes and the annular frame member 30.

A top wall 34 which is generally conical in shape spans radially outwardly at a downward slope from the perimeter of the inlet collar 32 in proximity to the top end thereof to the annular frame member 30 defining the outer perimeter of the storage bin at the top end thereof. The top wall may be formed as a separate rigid member independent of the flexible material of the storage envelope 14, or alternatively the top wall 34 may comprise a flexible panel of material which is integral with the material of the envelope to form part of the envelope structure.

In either instance, the storage envelope includes an upright perimeter wall portion 36 which is round in cross section along the full height thereof while spanning the full height of the storage bin between the annular frame member 30 of the upper frame portion at the top end of the wall to an outer perimeter of the base frame at the bottom edge of the wall in the working position. The top end of the perimeter wall portion 36 is secured in fixed relation to the annular frame member 30 at various locations about the circumference thereof to suspend the wall portion 36 of the envelope from the annular frame member 30. The perimeter wall portion 36 increases in diameter from the top edge to the bottom edge thereof so as to be generally frustoconical in shape and so as to locate the maximum circumference and maximum diameter thereof at the bottom edge in proximity to the outer perimeter of the base frame in the working position.

Turning now more particularly to the first embodiment, the base frame 16 in this instance defines a rigid hopper cone 100 having a rigid conical wall which tapers downwardly and inwardly from an upper perimeter edge 102 which is circular and lies in a horizontal plane, to a central discharge opening 104 centrally located at the bottom end of the cone so as to be supported at a location spaced upwardly above the ground surface when the base frame is engaged upon the ground surface. The base frame in this instance further includes a plurality of support members 106 comprising vertical leg members extending downwardly from the upper perimeter edge 102 of the cone at evenly spaced apart positions about the full circumference of the cone. The support members 106 are greater in height than the cone 100 to support the central discharge spaced above the ground when the bottom ends of the support members are engaged upon the ground.

The bottom edge of the wall portion 36 of the envelope in this instance is substantially equal in diameter to the cone such that the bottom edge can be joined to the upper perimeter edge 102 of the cone about the full circumference thereof. A hollow interior of the storage envelope remains open to the interior space defined within the hopper cone 100 immediately below the envelope.

A suitable gate assembly 108 is mounted at the bottom end of the cone to be operable between open and closed positions relative to the central discharge opening 104 in the conventional manner of a discharge gate for a grain storage bin having a hopper discharge.

The base frame in this instance further includes a plurality of lower spokes 110, each extending radially upwardly and inwardly from a respective one of the support members 106 to be joined together at the bottom end of the bottom section of the central support post at a central location spaced above the discharge opening 104, internally within the hopper cone. In this manner each spoke 110 communicates through a respective opening in the sloped wall of the hopper cone 100 at an intermediate location spaced above the central discharge 104 and spaced below the upper perimeter edge 102. The wall of the hopper cone 100 is sealed about each lower spoke 110 extending therethrough.

The base frame in this instance further includes a plurality of upper spokes 112, each extending radially upwardly and inwardly from respective locations on the upper perimeter edge of the hopper cone 100 so as to be evenly spaced apart in the circumferential direction. The upper spokes 112 are supported internally of the storage envelope and extend upwardly and inwardly for connection at the inner ends to the bottom section of the central support post at a location spaced upwardly from the bottom end thereof. The inner ends of the upper spokes are joined to the bottom section of the central support post at a location spaced above the inner ends of the lower spokes 110 that are at the bottom end of the bottom section.

In this embodiment, the central support post 18 is only operable between a fully extended working position and a fully retracted storage or transport position. In the working position, the central support post is extended to a height which results in the perimeter wall portion 36 of the storage envelope being frustoconical in shape under tension between the annular frame member 30 at the top end thereof and the upper perimeter edge of the rigid hopper cone at the bottom end thereof. In the working position, particulate material can be loaded through the inlet collar 32 to fill the full height of the rigid hopper cone and the storage envelope thereabove. Discharging the particulate material from the storage bin is accomplished through the central discharge opening 104 by operating the gate 108 in a conventional manner.

Once the storage bin has been emptied, the storage bin can be collapsed into the transport position by retracting the height of the central support post to a minimum height which locates the annular frame member 30 of the upper frame portion in close proximity to, but spaced slightly above, the upper perimeter edge 102 of the hopper cone. The flexible material forming the storage envelope permits the storage envelope to be readily collapsed into the rigid hopper cone 100. The compact size of the storage bin in the transport position readily permits loading of the collapsed storage bin onto suitable transport equipment for transport.

Turning now more particularly to the second embodiment, the base frame 16 in this instance includes a flat bottom which is arranged to be engaged on a ground surface in the working position. A main frame portion of the base frame is primarily defined by two side rails 218 which extend substantially a full length of the base frame in a longitudinal direction so as to be parallel and spaced apart from one another in a lateral direction along opposing sides of the main frame portion. A rear crossbar 220 is connected between the rear ends of the two side rails 218. Two hitch arms 222 are connected to the front ends of the two side rails respectively such that the two hitch arms extend forwardly and inwardly towards one another to be coupled at a forward end where a hitch 224 is mounted which is suitable for connection to a towing vehicle. A front jack 226 is coupled adjacent to the hitch 224 at the front end of the hitch arms 222 so as to be operable to selectively lift the front end of the base frame relative to the ground when actuated.

The main frame portion of the base frame 16 further includes two intermediate rails 228 which are coupled at the front ends thereof at intermediate locations on respective ones of the two hitch arms 222. The intermediate rails 228 extend rearwardly and taper inwardly towards one another from the forward ends at the hitch arms 222 to respective rear ends which are mounted at laterally spaced apart locations on the rear crossbar 220. The intermediate rails 228 and the two side rails 218 lie in a generally common horizontal plane so as to collectively define the bottom side of the main frame portion of the base frame which is suited for being engaged upon a ground surface in the working position.

Two transport wheels 230 are mounted at the rear end of the main portion of the base frame 16. The wheels 230 are supported at opposing ends of a common axle 232 extending laterally between the wheels and defining a common axis of rotation of the wheels which is perpendicular to the longitudinal direction of the side rails. Two support arms 234 are provided which are pivotally supported at laterally spaced apart positions in proximity to opposing ends of the rear crossbar 220 to extend generally rearwardly for supporting opposing ends of the axle 232 thereon. Pivoting the support arms 234 relative to the main frame portion of the base frame thus effectively adjusts the height of the transport wheels 230 relative to the base frame.

In the working position, the support arms are pivoted to be oriented upwardly and rearwardly such that the axle 232 and the transport wheels 230 supported thereon are supported entirely above the plane of the bottom side of the base frame to permit the base frame to be engaged directly on the ground.

For transport, two rear jacks 236 mounted at laterally spaced positions on the rear crossbar 220 are operated for lifting the rear end of the base frame relative to the ground surface therebelow to enable the support arms to be pivoted downwardly and rearwardly into a transport position where some or all of the transport wheels protrude below the plane of the bottom side of the base frame for rolling engagement with the ground in a forward rolling direction corresponding to the longitudinal direction of the side rails 218. Two support plates 238 fixed on the rear crossbar align with respective ones of the two support arms and include a plurality of cooperating apertures therein such that a pin can be received through a selected aperture of each support plate as well as a corresponding aperture in the respective support arms 234 to retain the transport wheels pinned in the transport position.

The base frame 16 further includes two lower wing frame portions 240 supported at laterally opposing sides of the main frame portion. Each wing frame portion 240 is pivotally supported along a respective one of the side rails 218 so as to be pivotal about a respective wing axis oriented in the forward rolling direction at the inner end of the wing frame alongside the respective side rail 218. The wing frames are pivotal between the working position and the transport position thereof.

In the working position the lower wing frame portions 240 extend outwardly from the main frame portion of the base frame 16 in opposing lateral directions so as to be substantially coplanar with the main frame portion, such that a bottom side of the wing frame portions is also suited for direct engagement on the ground surface.

In the transport position, the two lower wing frame portions 240 extend upwardly along opposing sides of the collapsed bin support frame so as to be substantially parallel to one another along opposing sides thereof. The lower wing frame portions partly define the overall width of the bin support frame in the lateral direction in both the working and transport positions such that folding the wing portions inwardly and upwardly from the working position to the transport position assists in reducing the lateral width of the bin support frame for transport.

Each wing frame portion 240 includes a perimeter frame member 242 which is generally semicircular in shape to extend partway about a perimeter of the bin in the working position. The bin is generally frustoconical in shape in the working position such that the base frame defined by the main frame portion and the two lower wing frame portions 240 is effectively circular in shape in the working position. Each perimeter frame member 242 extends partway about the perimeter of the assembled bin with the front and rear ends of the main frame portion of the base frame occupying the remainder of the perimeter of the assembled bin. Opposing ends of each perimeter frame member 242 are pivotally coupled at the respective wing axis at longitudinally spaced positions corresponding to opposing front and rear ends of the respective side rail 218.

Each wing frame portion 240 further includes a set of three crossbars 244 extending radially from the respective wing axes in a common plane with the perimeter frame member so as to be fixed at the outer end of the crossbar to the respective perimeter frame member while being pivotally supported at an inner end to the respective side rail 218 for pivotal movement about the respective wing axis. The crossbars are thus generally parallel to one another at longitudinally spaced positions between the front and rear ends of the respective side rail 218.

A plurality of mounting rings 246 are mounted at circumferentially spaced positions along each perimeter frame member 242 in which each mounting ring defines a respective stake aperture which enables in anchoring stake to be received therethrough for penetration into the ground to anchor the base frame to the ground surface in the working position.

The base frame 16 in this instance further includes a sump pit 250 which is supported upon the intermediate rails 228 at a central location relative to the perimeter frame members 242 of the lower wing frame portions 240 which receives the bottom edge of the perimeter wall portion 36 of the storage envelope thereon in the working position. The sump pit 250 is thus located at a central discharge location relative to the storage envelope as well.

The sump pit includes a floor 252 at the bottom side thereof and a plurality of side walls extending upwardly from a perimeter of the floor 252 to an upper perimeter edge 254 lying in a horizontal plane about a top opening of the sump pit.

An unloading auger assembly 256 communicates from the sump pit 252 a location rearward of the base frame. The auger assembly includes an auger tube rotatably receiving an auger therein in which the auger tube extends rearwardly from the sump pit generally horizontally along the top side of the base frame to a discharge end located immediately rearwardly of the rear crossbar of the base frame. The unload auger is intended to be supported externally of the storage envelope so as not to interfere with movement of the storage envelope between various positions thereof as described below.

The storage envelope in this instance includes a bottom wall which is generally flat and circular, having a diameter corresponding approximately to a diameter of the deployed base frame for being joined with the bottom edge of the wall portion 36 of the envelope about the full circumference thereof. In the working position, the bottom wall extends generally horizontally across the base frame upon which it is engaged such that the bottom edge of the wall portion 36 of the envelope is located directly adjacent the perimeter frame members 242 of the base frame. The bottom wall of the flexible storage envelope may include extra material formed therein along a radial path corresponding to the location of the unload auger 256 to define a channel within the bottom wall of material extending over the auger along the full length thereof to allow the auger to remain external of the storage envelope while the bottom wall of the storage envelope is laid upon the top side of the base frame surrounding the auger in the working position.

The bin support frame in this instance further includes a lower frame portion 258 which fixedly joins the bottom section of the central support post to the base frame at the location of the sump pit 250 so as to be centrally located relative to the surrounding perimeter wall portion 36 of the envelope. The lower frame portion 258 includes two columns 260 extending upwardly from laterally opposing sides of the sump pit. An upper crossbar 262 connects horizontally between the top end of the two columns 260 while a lower crossbar 264 connects horizontally between the two columns 260 at an intermediate location spaced above the sump. In this manner the bottom end of the bottom section of the central support post is supported on the lower crossbar 264 while an upper portion of the bottom section of the central support post is anchored on the upper crossbar 262 so as to support the bottom end of the central support post spaced above the discharge sump.

The bottom wall of the envelope includes a central opening therein in which an inner perimeter edge of the central opening is joined to the upper perimeter edge 254 of the sump pit. In the normal working position, the bottom wall lies in a generally flat plane engaged upon the top side of the deployed base frame so as to be lower in elevation than the upper perimeter edge of the sump pit 250. However, most of the contents of the storage bin can still be emptied by flowing to the sump pit under gravity in the working position. Once the angle of repose of particulate material within the storage bin spans from the perimeter wall portion of the storage envelope to the upper perimeter edge 254 of the sump pit and particulate material no longer discharges to the sump pit under gravity, the central support post can be further extended in height beyond the working position into an unloading position.

In the unloading position of the bin support frame, the upper frame portion 20 of the bin support frame is lifted from the working position by a vertical distance measured from the working position which corresponds approximately to the radius of the bottom wall of the storage envelope. This effectively lifts the bottom wall of the storage envelope into an upright orientation terminating at a bottom end at the inner perimeter edge of the bottom wall which is joined to the upper perimeter edge of the sump pit. In this manner, the bottom wall is fully suspended from the upper frame portion 20 of the bin support frame at a location fully above the base frame together with the perimeter wall portion 36. Thus, in the unloading position of the central support post, the inner perimeter edge of the bottom wall of the storage envelope which is joined to the upper perimeter edge of the sump pit defines the lowermost portion of the storage envelope so that all particulate material within the storage envelope can be discharged by gravity into the open top end of the sump pit.

Positioning of the bin in the working position involves engaging the bottom side of the base frame on a suitable foundation or a ground surface by pivoting the transport wheels upwardly relative to the base frame and lowering the lower wing frame portions 240 downwardly to be substantially coplanar with the main frame portion of the base frame. Actuating the central support post into the extended position thereof raises the upper frame portion relative to the base frame. The flexible envelope suspended on the bin support frame is effectively supported in the working position simply by deploying the bin support frame into the working position.

Particulate material is loaded into the storage bin in a conventional manner by discharging material through the open top end of the inlet collar 94 into the storage chamber which substantially fully occupies the interior of the storage envelope. The filling of particulate material into the bin effectively tensions the flexible envelope into a maximum diameter configuration of the working position.

To unload particulate material from the storage bin, the unloading auger is operated to remove material from the sump pit to the exterior of the bin. Once the angle of repose of particulate material within the bottom of the storage bin from the perimeter wall to the sump pit at a central discharge location of the bin no longer allows the particulate material to reach the sump pit by gravity alone, the central support post can be actuated into the unloading position. Any remaining particulate material above the floor member is then effectively guided by the suspended bottom wall of the storage envelope towards the sump pit at the lowermost location of the envelope.

In order to displace the emptied bin to a different storage location, the central support post is retracted towards the transport position. This can be done in stages in which operators can gather the loose envelope material to compact the envelope towards the centre of the structure at each stage of lowering. Finally, any ground stakes securing the lower wing frame portions and base frame to the ground are removed such that the lower wing frame portions can be pivoted upwardly and inwardly to assist in containing the loose envelope material between the lower wing frame portions in the transport position. The lower wing frame portions may be lifted from the working position to the transport position manually, or with the assistance of various actuating devices including hydraulics, winches, etc.

Once the bin support structure and storage envelope have been secured in the transport position, the rear jacks can be used to lift the rear end of the base frame so that the transport wheels can be lowered and pinned in the transport position thereof. The rear jacks are then raised so as not to interfere with rolling transport. The front jack can then be used to lift the hitch at the front end of the base frame relative to a towing vehicle for connection of the hitch to the towing vehicle. Once the front jack is lifted out of the way, the structure is ready for forward rolling movement in the longitudinal direction of the base frame together with the towing vehicle.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A portable storage bin comprising:
   a base frame for being supported on a ground surface;
   a bin support frame supported on the base frame so as to be operable between a working position and a transport position in which the bin support frame is reduced in height from the base frame in the transport position relative to the working position; and
   a storage envelope supported on the bin support frame to define a storage chamber for storing particulate material therein in the working position of the bin support frame;
   the storage envelope being collapsible with the bin support frame from the working position to the transport positions;
   wherein the bin support frame comprises an upper frame portion above the base frame from which the storage envelope is suspended in the working position and a collapsible frame portion extending between base frame and the upper frame portion which is extendable in height for raising the upper frame portion relative to the base frame from the transport position to the working position; and
   wherein the collapsible frame portion comprises a plurality of telescoping sections such that a height of the bin support frame in the transport position is less than half of a height of the bin support frame in the working position.

2. The bin according to claim 1 wherein the storage envelope is formed of a pliable material.

3. The bin according to claim 1 wherein the collapsible frame portion is a central support post extending between base frame and the upper frame portion which is extendable in height for raising the upper frame portion relative to the base frame from the transport position to the working position.

4. The bin according to claim 3 wherein the upper frame portion comprises an annular frame member defining a perimeter of the storage envelope at a top end thereof from which an upright perimeter wall of the storage envelope is suspended.

5. The bin according to claim 4 wherein the upright perimeter wall of the storage envelope increasing in diameter from the top end to a bottom end supported on the base frame such that the upright perimeter wall of the storage envelope is frustoconical in shape.

6. The bin according to claim 4 further comprising:
   an inlet collar defining a loading opening therethrough supported at a location spaced above and centrally relative to the annular frame member; and
   a top wall which is conical in shape, spanning between the inlet collar and the annular frame member for enclosing a top end of the storage envelope.

7. The bin according to claim 6 wherein the upper frame portion further comprises a plurality of radial frame members spanning radially between a top end of the central support post and the annular frame member, the inlet collar being supported above the radial frame members.

8. The bin according to claim 1 wherein the base frame comprises:
   a rigid hopper cone tapering downwardly and inwardly from an upper perimeter edge to a central discharge at a bottom end of the cone; and
   a plurality of support members extending downwardly from the upper perimeter edge of the cone to a bottom end of the base frame so as to support the central discharge of the cone spaced above the ground surface when the support members are engaged upon the ground surface.

9. The bin according to claim 8 wherein the collapsible frame portion is a central support post extending between base frame and the upper frame portion, and wherein a bottom end of the central support post is fixedly joined to the base frame at a location spaced above the central discharge.

10. The bin according to claim 9 wherein the bin support frame further comprises a plurality of radial spokes extending at an intermediate location through the cone between the bottom end of the central support post and the support members respectively.

11. The bin according to claim 9 wherein the bin support frame further comprises a plurality of radial spokes received internally within the storage envelope, the radial spokes each extending upwardly and radially inwardly from the upper perimeter edge of the cone to the central support post.

12. The bin according to claim 1 wherein the upper frame portion comprises an annular frame member defining a perimeter of the storage envelope at a top end thereof from which an upright perimeter wall of the storage envelope is suspended.

13. The bin according to claim 12 wherein the upright perimeter wall of the storage envelope increases in diameter from the top end to a bottom end supported on the base frame such that the upright perimeter wall of the storage envelope is frustoconical in shape.

14. The bin according to claim 12 further comprising:
an inlet collar defining a loading opening therethrough supported at a location spaced above and centrally relative to the annular frame member; and
a top wall which is conical in shape, spanning between the inlet collar and the annular frame member for enclosing a top end of the storage envelope.

15. The bin according to claim 14 wherein the upper frame portion further comprises a plurality of radial frame members spanning radially between a top end of the central support post and the annular frame member, the inlet collar being supported above the radial frame members.

16. A portable storage bin comprising:
a base frame for being supported on a ground surface;
a bin support frame supported on the base frame so as to be operable between a working position and a transport position in which the bin support frame is reduced in height from the base frame in the transport position relative to the working position; and
a storage envelope supported on the bin support frame to define a storage chamber for storing particulate material therein in the working position of the bin support frame;
the storage envelope being collapsible with the bin support frame from the working position to the transport position;
the bin support frame comprising an upper frame portion above the base frame from which the storage envelope is suspended in the working position and a central support post extending between base frame and the upper frame portion; and
the central supporting post being extendable in height for raising the upper frame portion relative to the base frame from the transport position to the working position.

17. The bin according to claim 16 wherein the upper frame portion comprises an annular frame member defining a perimeter of the storage envelope at a top end thereof from which an upright perimeter wall of the storage envelope is suspended.

18. The bin according to claim 17 wherein the upright perimeter wall of the storage envelope increases in diameter from the top end to a bottom end supported on the base frame such that the upright perimeter wall of the storage envelope is frustoconical in shape.

19. The bin according to claim 17 further comprising:
an inlet collar defining a loading opening therethrough supported at a location spaced above and centrally relative to the annular frame member; and
a top wall which is conical in shape, spanning between the inlet collar and the annular frame member for enclosing a top end of the storage envelope.

20. The bin according to claim 19 wherein the upper frame portion further comprises a plurality of radial frame members spanning radially between a top end of the central support post and the annular frame member, the inlet collar being supported above the radial frame members.

* * * * *